United States Patent
Elias

(10) Patent No.: US 11,226,016 B1
(45) Date of Patent: Jan. 18, 2022

(54) AUTOMATIC FREE-COASTING FREEWHEEL APPARATUS

(71) Applicant: DRIVEN INNOVATIONS Ltd., Ramla (IL)

(72) Inventor: Amir Elias, Ramat HaSharon (IL)

(73) Assignee: DRIVEN INNOVATIONS LTD., Ramla (IL)

( * ) Notice: Subject to any disclaimer, the term of this patent is extended or adjusted under 35 U.S.C. 154(b) by 0 days.

(21) Appl. No.: 17/094,846

(22) Filed: Nov. 11, 2020

(51) Int. Cl.
*F16D 41/16* (2006.01)
*F16D 41/12* (2006.01)
*F16D 43/24* (2006.01)
*F16D 41/30* (2006.01)

(52) U.S. Cl.
CPC .............. *F16D 41/12* (2013.01); *F16D 43/24* (2013.01); *F16D 41/30* (2013.01)

(58) Field of Classification Search
CPC ..... F16D 41/12–16; F16D 41/30; F16D 43/24
USPC ...................................... 192/103 C
See application file for complete search history.

(56) References Cited

U.S. PATENT DOCUMENTS

| 5,257,685 | A | * | 11/1993 | Tichiaz | F02N 15/027 |
| | | | | | 192/104 C |
| 9,199,509 | B2 | | 12/2015 | Koshiyama | |
| 9,599,172 | B2 | | 3/2017 | Alley | |
| 2005/0051659 | A1 | * | 3/2005 | Wolner | F16D 63/006 |
| | | | | | 242/383.5 |
| 2008/0060903 | A1 | * | 3/2008 | Lian | F16D 43/18 |
| | | | | | 192/105 CD |

(Continued)

FOREIGN PATENT DOCUMENTS

EP    2340945 B1 *  5/2012   ........... B60B 27/023

*Primary Examiner* — David R Morris
(74) *Attorney, Agent, or Firm* — Soroker Agmon Nordman

(57) ABSTRACT

An automatic free-coasting freewheel (AFF) having: a free-coasting state; an engaged state and a freewheeling state, the AFF comprising: a driving member; an inertial unit; a driven member; a freewheeling biasing member; and an axis of rotation defining an axle; wherein the driving member, driven member and inertial unit are coaxially mounted onto the axle and rotatable thereupon, the driving member configured to controllably rotate relative to the inertia unit; the driving and driven members having angular velocities: $\omega_{DRIVING}$ and $\omega_{DRIVEN}$; and angular accelerations $\alpha_{DRIVING}$ and $\alpha_{DRIVEN}$; the inertial unit further comprising a suspension member configured with at least one set of: a locking member and a free-coasting biasing member; wherein the inertial unit is configured to interact between the driving and the driven member to automatically shift between the states, depending upon $\alpha_{DRIVING}$ versus a threshold value ($\alpha_{MIN}$) and $\omega_{DRIVEN}$ and $\omega_{DRIVING}$.

11 Claims, 31 Drawing Sheets

(56) References Cited

U.S. PATENT DOCUMENTS

| | | | | |
|---|---|---|---|---|
| 2014/0137681 A1* | 5/2014 | Vicente, Jr. | ............. | F16D 43/16 74/411.5 |
| 2015/0377306 A1* | 12/2015 | Greene | ................... | F16D 41/16 192/43.1 |

* cited by examiner

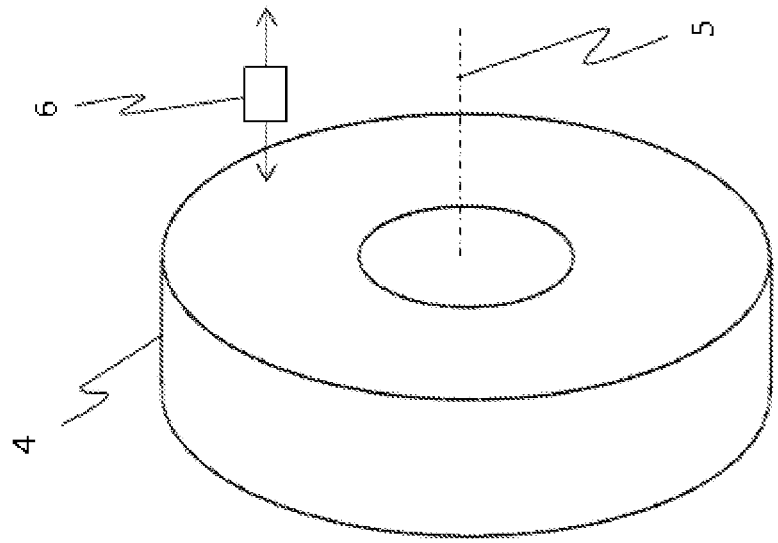
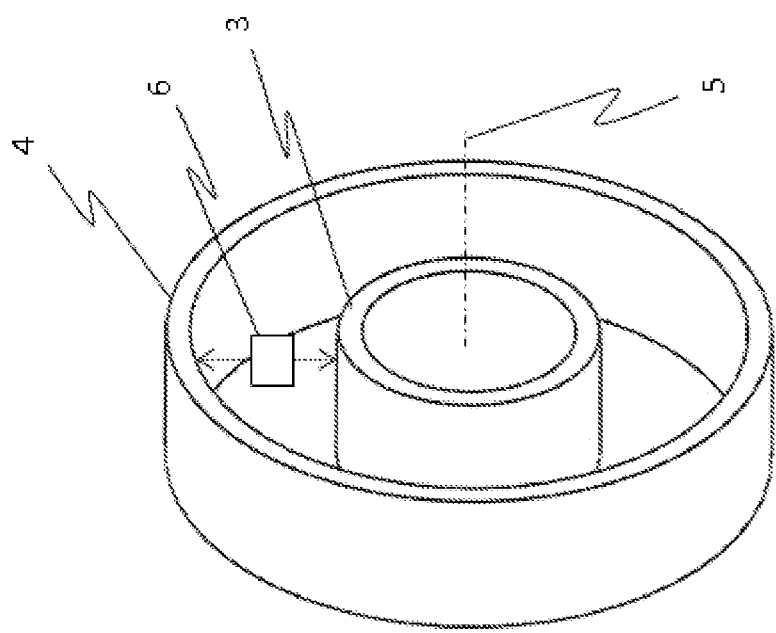
Prior Art
FIG 2A

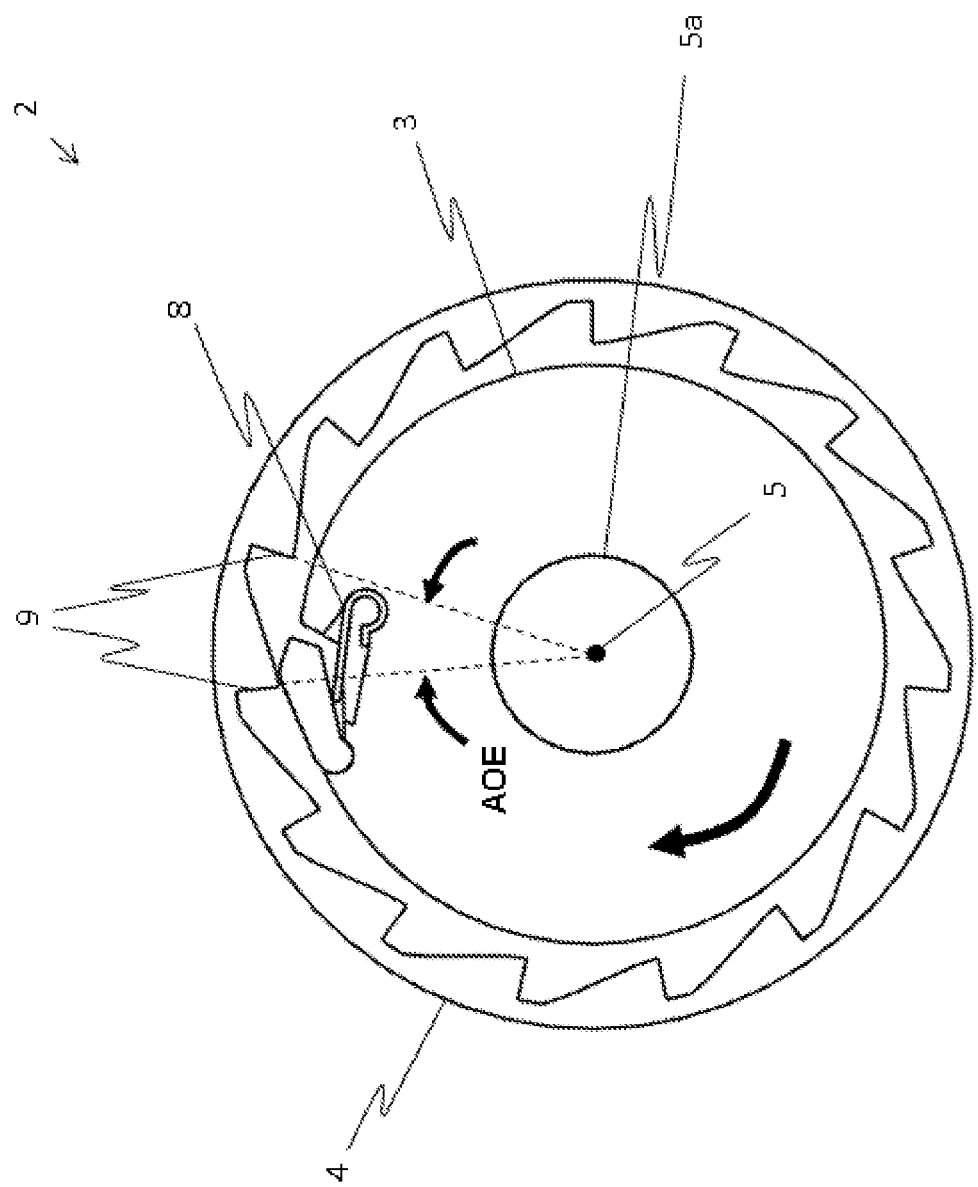

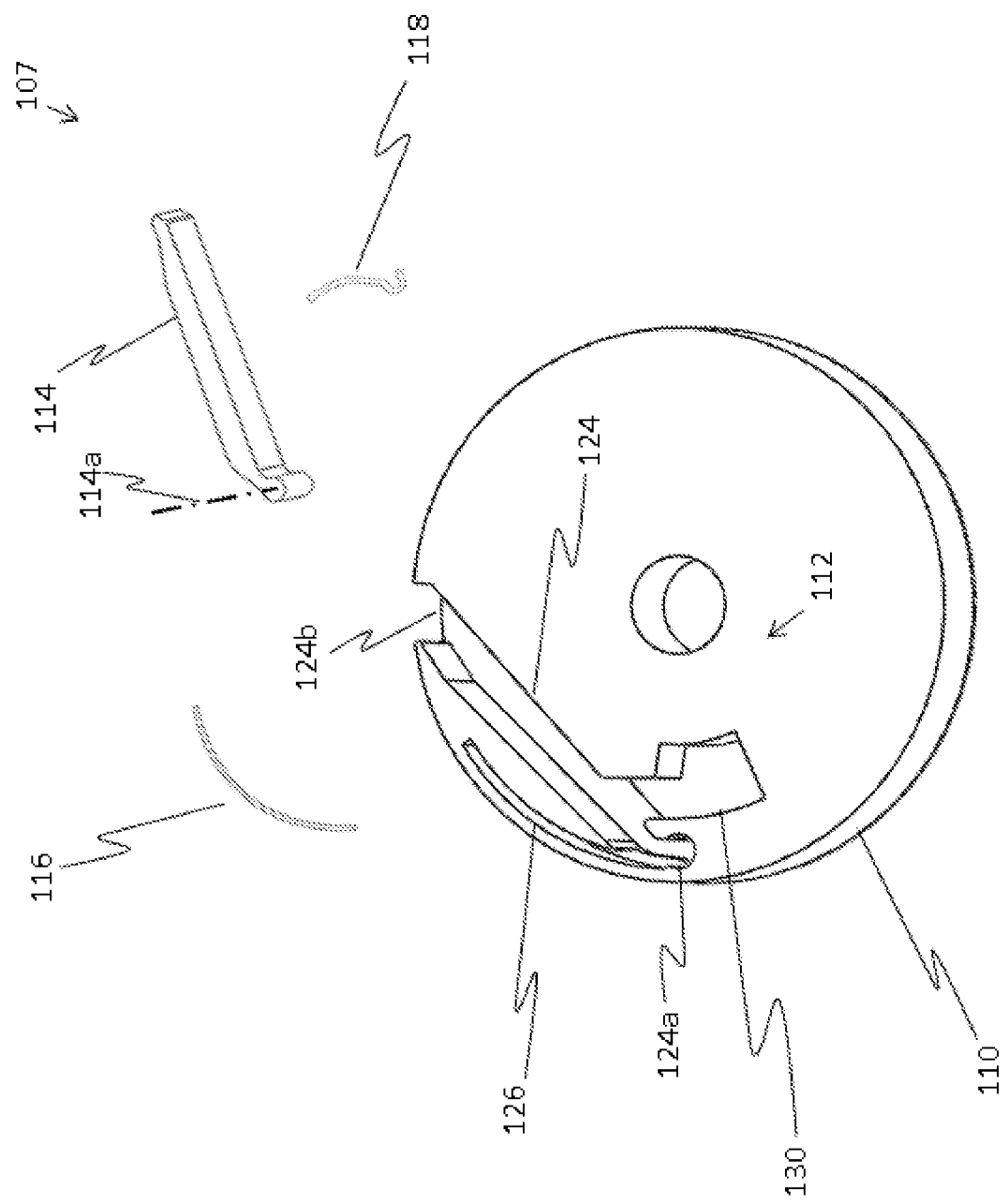

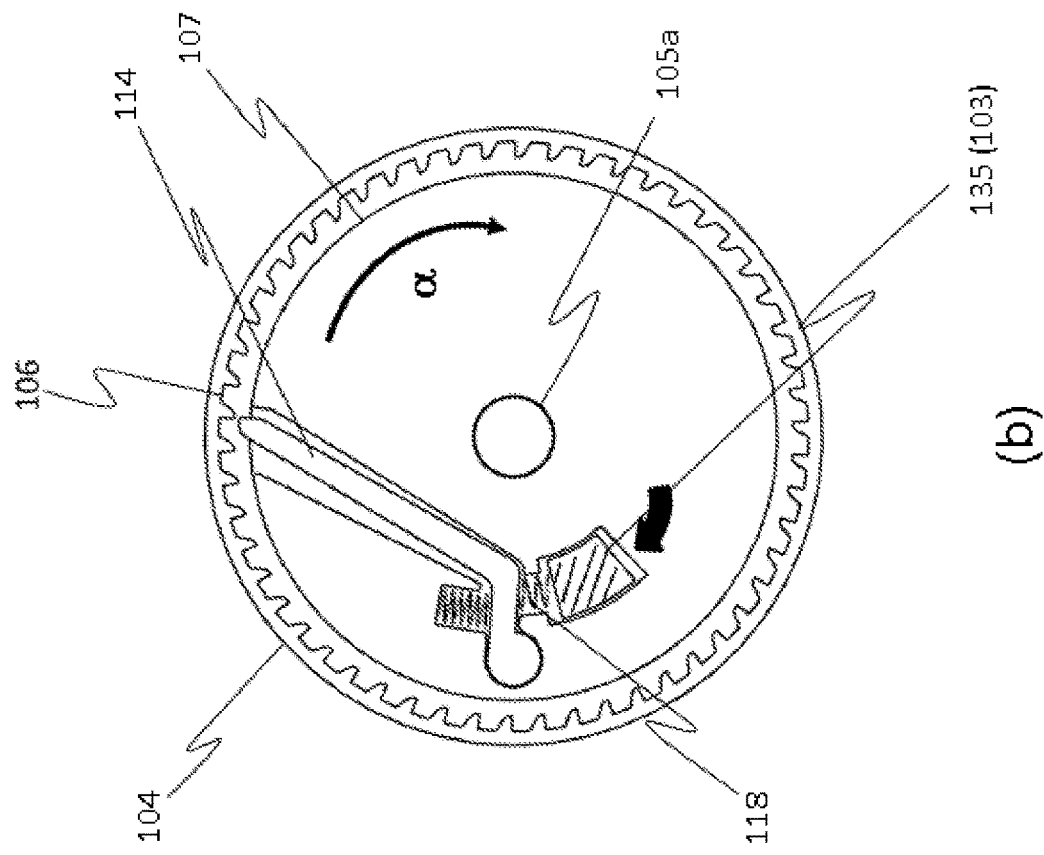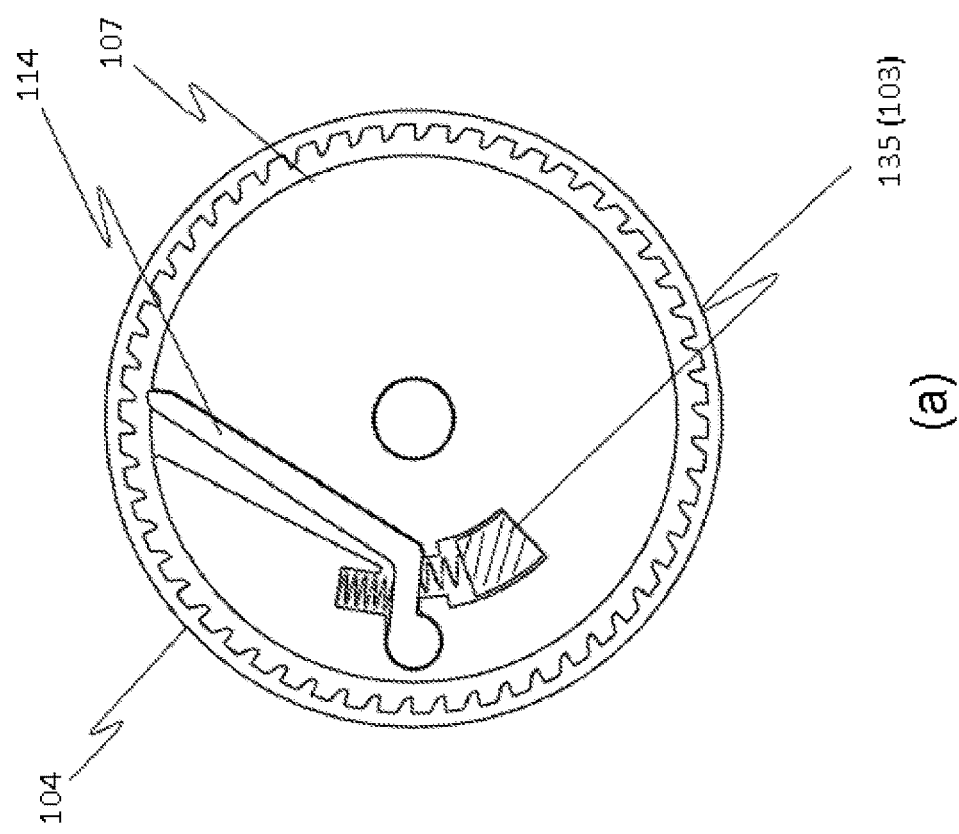
FIG 8A

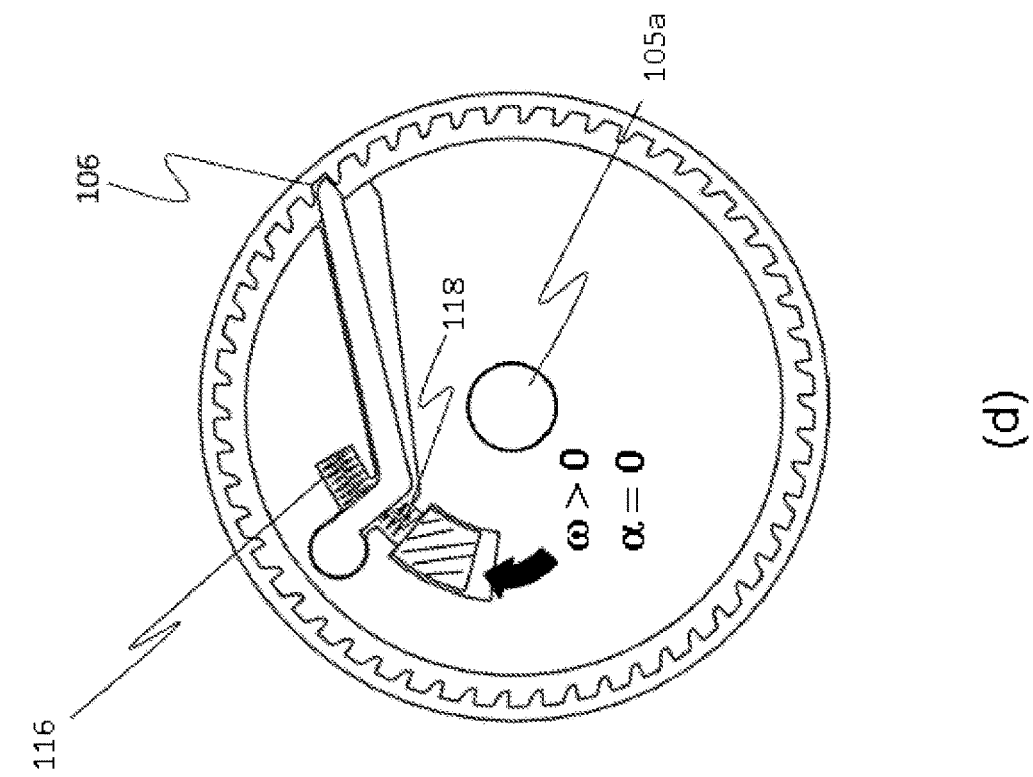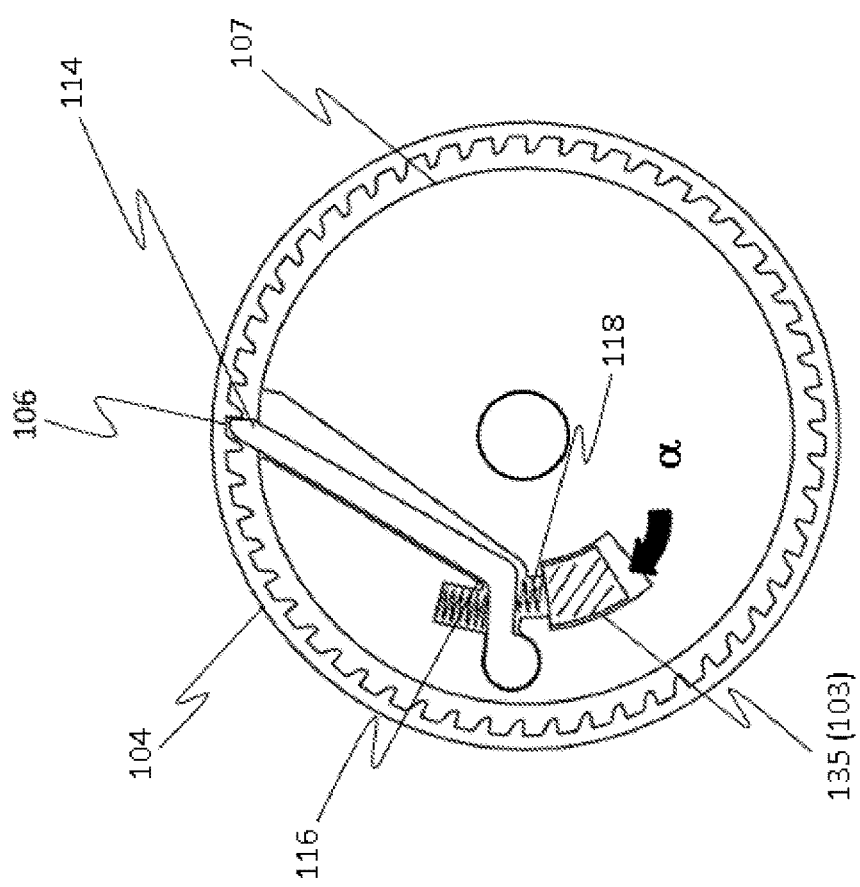
FIG 9B

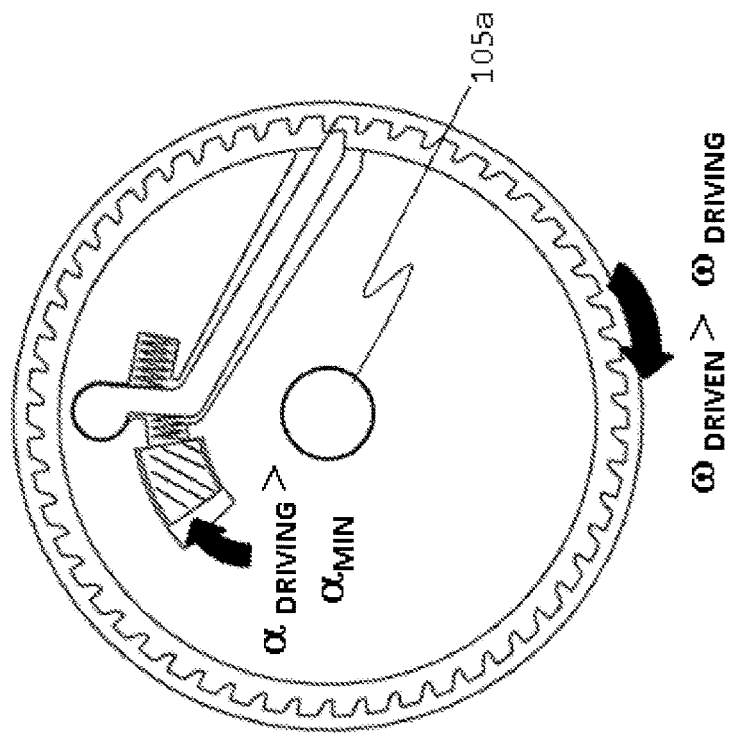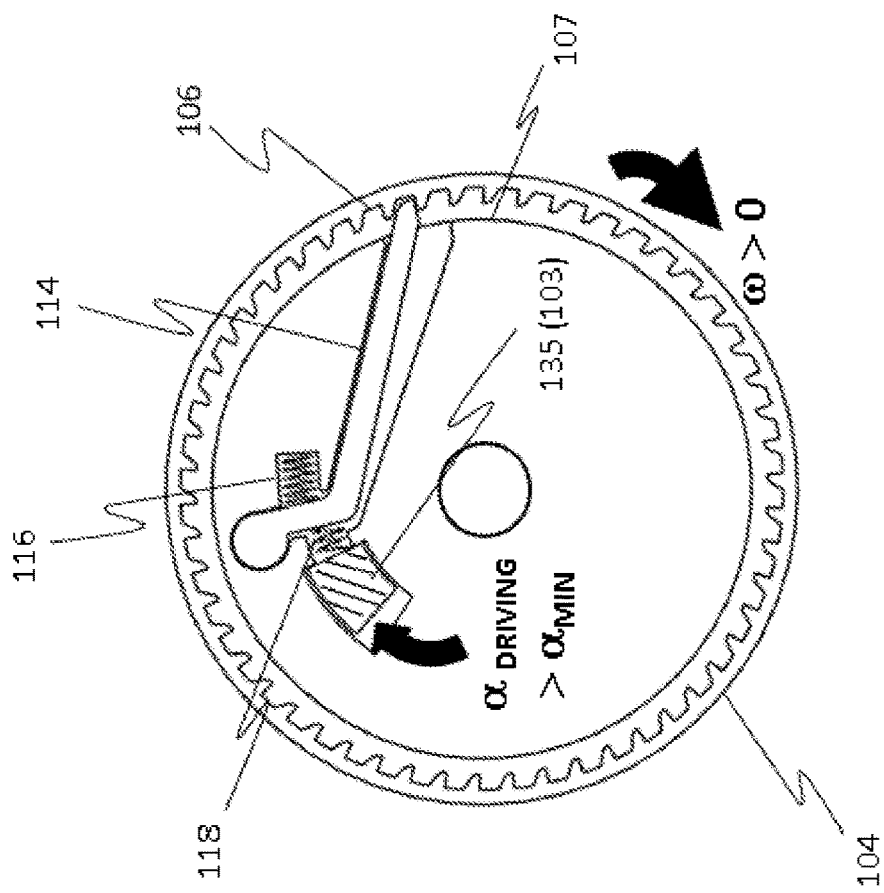
FIG 11B

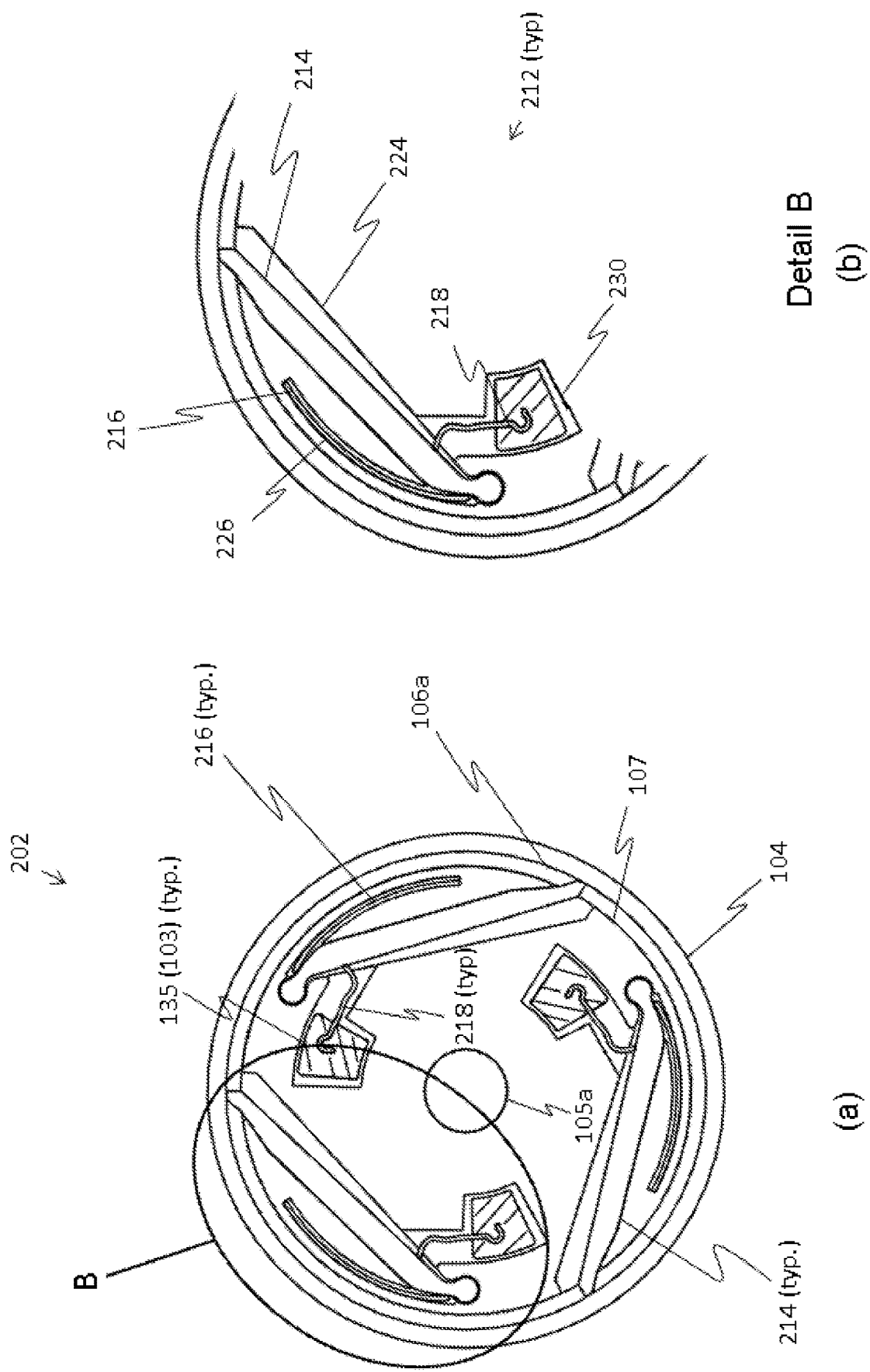

(c)

Detail "C"

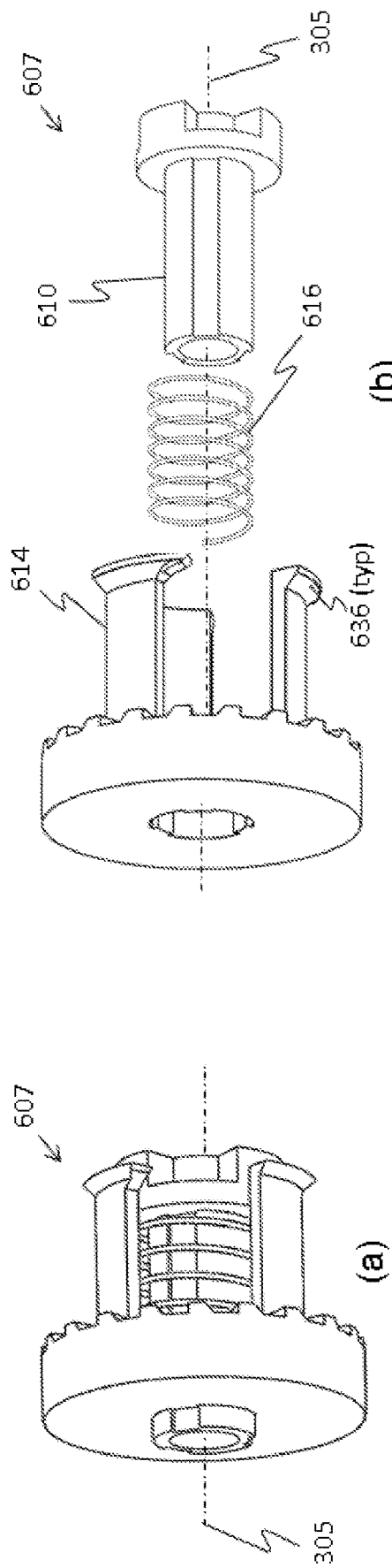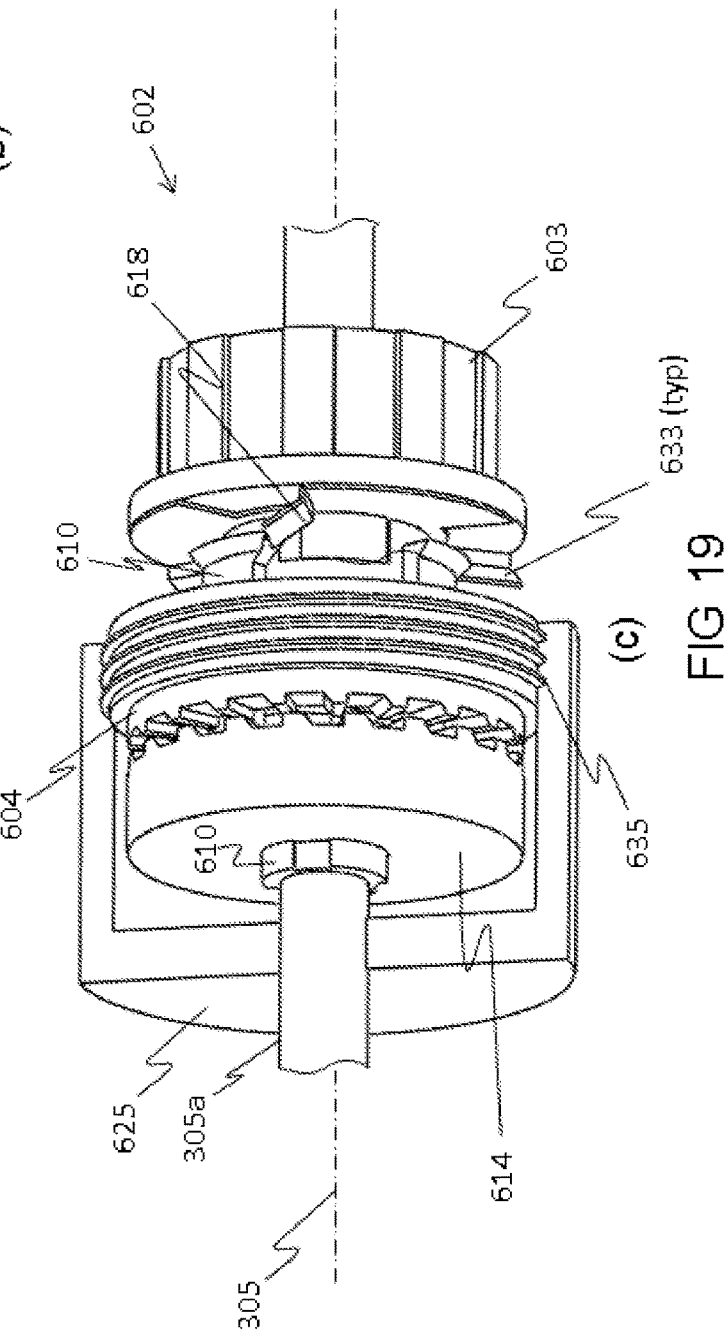
FIG 19

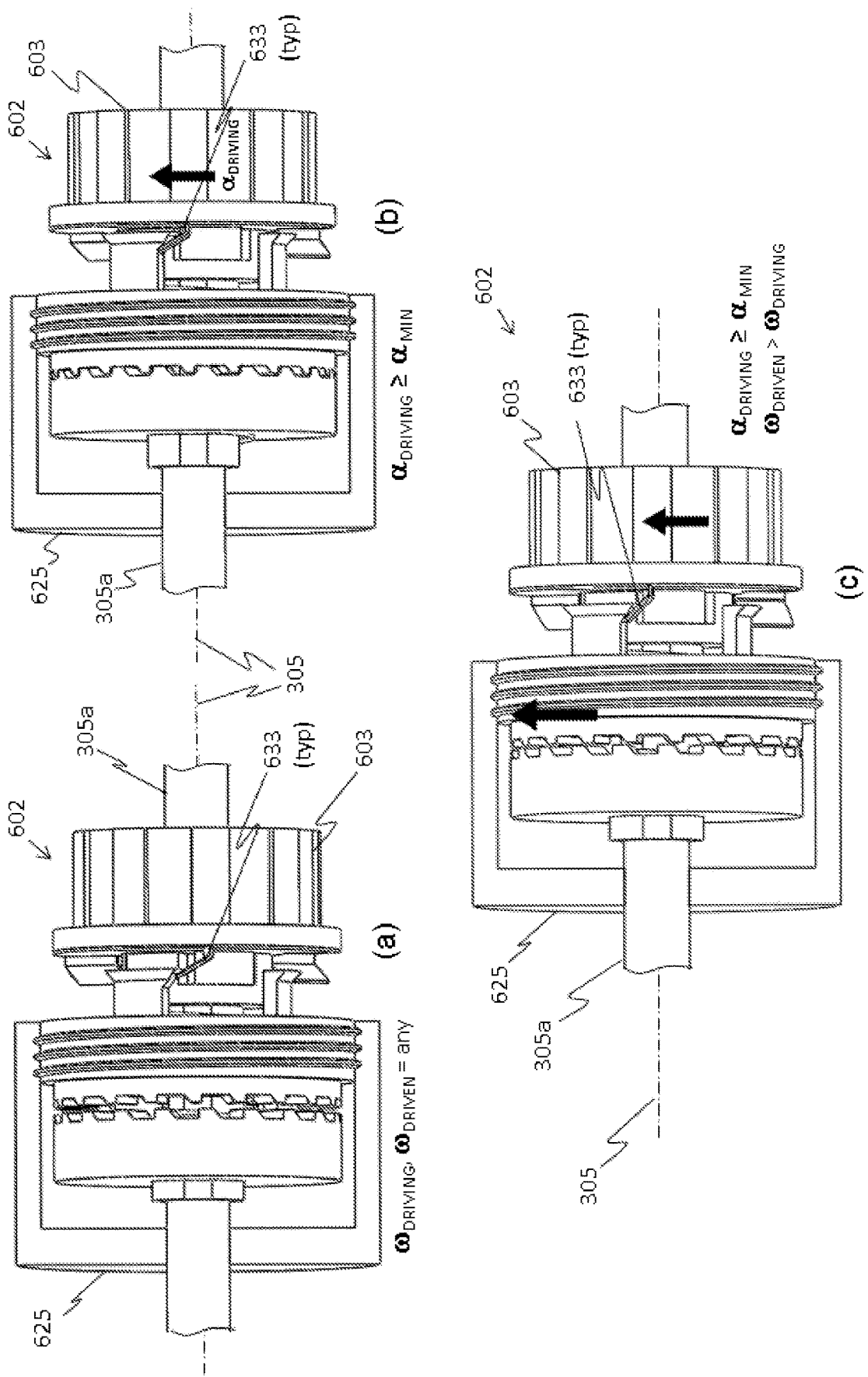

AUTOMATIC FREE-COASTING FREEWHEEL APPARATUS

FIELD OF THE INVENTION and BACKGROUND

Embodiments of the current invention relate to the field of rotational-based devices with freewheels, and specifically to an automatic free-coasting freewheel apparatus and method.

Freewheels are found in a wide variety of rotational-based mechanical devices, such as, but not limited to: bicycles; helicopters; cars; motorcycles; scooters; generators; transmissions; and toys. In the specification and claims which follow, the term "freewheel" is intended to mean a mechanism for transmitting rotational motion in one direction (usually called "forward") from a first part, called a "driving member", to a second part called a "driven member", while allowing the driven member to rotate forward faster than the driving member at any given time, as known in the art. In a freewheel, the driven member is accelerated by the driving member—but the driven member is typically not intended to be decelerated by the driving member when the driving member slows or stops rotating forward.

A mode typical of motion/operation of a freewheel is when the driving member first rotates the driven member, and the driving member then stops rotating. In this case, the driven member continues to rotate. The driving member is typically rotated by an external rotational source such as, but not limited to: a pedal; a transmission; a motor; an engine; and wind power. The driven member is mounted or integrally formed with elements such as, but not limited to: a hub; a propeller; a wheel: a gear; and a shaft.

In the specification which follows, a connection of the driven member with elements such as those listed above is to be understood/assumed, as known in the art, even though no such integral connections are described and/or shown hereinbelow.

Throughout the specification which follows, exemplary configurations of freewheels are presented, related to bicycles. However, and as noted above, the principle of freewheel configuration and operation is shared by a wide variety of rotational-based mechanical devices.

When the driving member rotates forward relative to the driven member, a third part, called either a "locking member" or a "linkage member", serves to engage and lock the driven member with the driving member, causing the two members to rotate unison. This known as a "drive state" or an "engaged state".

When the driven member rotates forward faster than the driving member the locking member is configured to unlock (or "disengage") the driven member from the driving member so that the driven member continues to rotate. When the driven member is unlocked in this way, the mechanism is said to "freewheel" or to "over-run", or to be in a "freewheeling state"—as known in the art. Note that it is not necessary for the driving member to rotate forward for freewheeling to take place. The driving member can be stationary, or it can rotate in a backward direction while the driven member rotates forward. Additionally, the driven member does not necessarily need to rotate forward, and the driven member may be stationary while the driving member rotates backwards. The driven member may also rotate backward (if allowed, as described further hereinbelow) while the driving member rotates backward, but at a faster rotational speed. All of the cases described hereinabove typify the term "freewheeling", which applies to relative rotational movements, as described hereinabove.

The term "coasting" is typically used to describe the configuration when the driven member rotates forward while the driving member remains stationary. Coasting is a singular, but important/major example of freewheeling.

Reference is currently made to FIG. 1, which is a prior art representation of a freewheel 2, in an engaged state (a) and in a freewheeling state (b), comprising: a driving member 3; a driven member 4; a common axis of rotation 5, which defines an exemplary axle 5a (typically mechanically fixed to the vehicle/bicycle); and a locking member 6—as described hereinabove—and a biasing member 8. Locking member 6 is typically mounted to driving member 3 (or sometimes to driven member 4, depending on the freewheel design) and serves to engage the driving member with the driven member. Locking member 6 is biased by biasing member 8 (an exemplary spring in the figure) to constantly contact an engagement surface 9 which is located on the driven member (as shown in the figure), but can also be located on the driving member or on both, depending on the freewheel configuration.

In view (a) of the referenced figure, rotation of driving member in the direction indicated about axle 5a serves to bias locking member 6 against engagement surface 9 to lock/engage driven member 4 in an engaged state (also known as "drive state"). Rotation of the driven member and its engagement surface 9 relative to locking member 6 in the opposing direction about the axis of rotation serves to not allow engagement of locking member 6 with engaging surface 9—in a freewheeling state. The default state of freewheel 2 is the engaged state, shown in view (a). In FIG. 1, exemplary locking member 6 is a pawl, as known in the art.

Reference is currently made to FIGS. 2A and 2B, which are prior art schematic representations of exemplary freewheel designs, similar to prior art freewheel 2 of FIG. 1. Apart from differences described below, driving member 3, driven member 4; common axis of rotation 5, and axle 5a of FIG. 1 (hereinabove) are identical in notation, configuration, and functionality to that shown in FIGS. 2A and 2B, and elements indicated by the same reference numerals and/or letters are generally identical in configuration, operation, and functionality as described hereinabove.

In FIG. 2A, view (a) shows a radially-activated locking member 6, similar to that shown in FIG. 1. In view (b) axially-activated locking member 6 serves to engage driving member 3 (not shown) and driven member 4, as known in the art. Such an axially-activated freewheel design is additionally shown in FIG. 2B, further described hereinbelow.

In FIG. 2B, as opposed to the exemplary radially-activated pawl locking member shown in FIG. 1, the freewheel uses an axially activated spring-clutch mechanism, as known in the art, to yield an engaged state, view (a), and a freewheeling state, view (b). As shown in the referenced figure, when the biasing member (spring) between driving member 3 and driven member 4 is expanded, yielding larger dimension $C_1$, locking members 6 engage with engaging surfaces 9 to engage/lock driving member 3 and driven member 4 together. When the spring between driving member 3 and driven member 4 is compressed, yielding smaller dimension $C_2$, locking members 6 unlock/disengage from engaging surfaces 9, yielding a freewheeling state.

Some freewheel pawl designs have individual pawls with a multi-step tip so that a respective pawl can nonetheless engage 2-3 teeth of the ratchet, and thus yield a higher torque load distribution—as known in the art.

Freewheel Problems

The following are problems with simple freewheels:

In the freewheeling state the mechanism is subject to sliding friction between the locking member and the engagement surface, yielding energy loss and wear and serving to decrease the rotational velocity of the driven member.

Additionally, in most bicycles, if the rear wheel rotates backwards, the wheel forces the bicycle pedals to rotate backward. This occurs—as noted hereinabove—because the bicycle freewheel has a one-way mechanism. In this case, backward rotation of the wheel is similar to rotating the driving member faster than the driven member as described hereinabove, causing the mechanism to engage.

Ratchet Ring Surface Locking vs Race Surface Locking—and Problems

In the discussion which follows, the expression "ratchet ring" is intended to mean the typical inner surface of driven member 4, having a plurality of engagement surfaces 9, typical of radially-engaged freewheels—as shown in FIG. 1 and FIG. 2B. A ratchet ring, having a plurality of alternate teeth—and grooves in its periphery (i.e. radially distributed) serves to transition the freewheel from a freewheeling state to a drive state, as described hereinabove. When the driving member rotates forward faster than the driven member, the locking member is not necessarily exactly aligned with respective engagement surfaces of the ratchet ring to enable engagement of the mechanism. As a result, an additional rotation may be necessary for the locking member to align and engage with a respective engagement surface of the ratchet ring.

Reference is currently made to FIG. 3, which is a prior art representation of prior art freewheel 2 of FIG. 1, illustrating an Angle of Engagement (AOE) in radially-engaged freewheels. Apart from differences described below, driving member 3, driven member 4; common axis of rotation 5; and engagement surface 9 of FIGS. 1 and 2B (hereinabove) are identical in notation, configuration, and functionality to that shown in FIG. 3, and elements indicated by the same reference numerals and/or letters are generally identical in configuration, operation, and functionality as described hereinabove. AOE is a maximum angle of rotation necessary for the locking member to lock/engage the driving and driven members—as described hereinabove regarding the ratchet ring.

It is generally advantageous to minimize AOE for freewheels. One way to reduce AOE is to increase the number of engagement surfaces (i.e. "teeth") of a ratchet ring. A lower AOE value infers a faster transition from freewheel to engaged states. However, the increasing the number of teeth in the ratchet ring, for a given diameter, yields thinner/weaker individual teeth, thus yielding higher ratchet ring wear.

A typical freewheel pawl design produces the familiar, characteristic "clicking sound" in the freewheeling state, due to the sequential biasing of the locking member along the ratchet ring—meaning individual pawls sequentially contacting and sliding past teeth in the ratchet ring. As opposed to the ratchet ring configuration, race surface locking (i.e. sprag, trapped roller/ball, and ramp roller clutches, as known in the art) relies solely on traction. Race surface configurations do not produce the typical freewheeling clicking sound characteristic of pawl designs. Additionally, race surface AOE is considered near-zero, yielding an "instantaneous" shift from freewheeling to engagement.

Ensuring good engagement with sufficient traction between the locking member and the race surface is necessary so that the locking member engages continuously and does not slide. Sufficient traction means sufficient static friction, which depends on the biasing member force and the coefficient of static friction of the surface. The force of the biasing member is typically maintained during many hours of use. However, the coefficient of static friction gradually decreases due to surface wear during the freewheeling state.

When the locking member and/or the race surface wear (when the driving member rotates faster than the driven member) the race surface and the locking member slide over one other, instead of engaging, and failure of the mechanism occurs. Race surface locking may also fail if excessive liquid/lubricant is present, for any reason.

Free-Coaster Mechanism—and Problems

Free-coasters were developed for freestyle BMX bicycles to allow a bicycle to coast backwards without forcing the pedals to rotate backwards. This characteristic is typical when performing a well-known trick called a "fakie", when the user coasts backward with his bicycle, as known in the art. Free-coasters have two states of operation: (1) a free-coasting state; and (2) an engaged/drive state; and both states are manually activated and de-activated by the user.

The free-coasting state occurs when the locking member is shifted away from the driven member—as known in the art. As a result, the driven member is free to rotate forward and backward—and the driven member freewheels with no sliding friction. To activate the free-coasting state the user must rotate the pedals backward a certain angle, known as a "slack angle" (or simply "slack"). During the slack backward rotation, the locking member is shifted away from contacting the driven member and the locking member is maintained in the shifted "away" position.

When the user wishes to accelerate and pedal the bicycle forward, he needs to first deactivate the free-coasting state by first pedaling forward by the slack angle, until the locking member is shifted back into contact with the driven member, yielding the engaged state. Additional forward pedaling serves to accelerate the bicycle forward.

Chen, in European Patent number EP2340945, whose disclosure is incorporated by reference, is an example of free-coaster prior art, in which Chen describes a hub assembly for a bicycle, which includes a shaft, a hub body, a driven ring, a drive seat, a rotation ring, a plurality of pawl members, a plurality of push balls, a mounting sleeve, a damping ring, and a plurality of tension adjusting mechanisms. Thus, each of the pawl members is driven by each of the push balls in a rolling manner so that each of the pawl members is moved smoothly and stably without incurring sliding friction, thereby facilitating operation of the drive seat. In addition, each of the tension adjusting mechanisms is used to adjust the damping force of the damping ring, so that the damping force of the damping ring is distributed evenly.

Free-coaster mechanisms have the following problems:
- The free-coasting state needs to be manually activated by the user—as described above.
- AOE is considerably increased due to the additional slack angle.
- There is no freewheeling state. In other words, if the user starts to rotate the pedals forward (rotating the driving member forward) to shift into the engaged state while the driven member is rotating forward faster, pedal rotation may cause a mechanical backlash or a jam. In any case, the driven member is forced to match the speed of the driving member, as opposed to conventional freewheels.
- In the engaged state, dynamic friction causes energy loss and rapid wear to a resisting member (typically known as "damper") which is found only in free-coasters. When the resisting member is worn/fails the shifting mechanism stops functioning.

Free-Coaster Freewheels Versus Free-Coasters

Free-coaster freewheels are free-coasters that can additionally freewheel, thereby yielding three distinct states of operation:
1. free-coasting state;
2. engaged state; and
3. freewheeling state.

Free-coaster freewheels function similarly to free-coasters, as described hereinabove—requiring the user to manually activate and de-activate the free-coasting state. Additionally, free-coaster freewheels are shifted between engaged and freewheeling states the same way as in all freewheels.

Examples of free-coaster freewheels prior art are noted hereinbelow.

In U.S. Pat. No. 9,199,509, whose disclosure is incorporated by reference, Koshiyama et al. describe a bicycle hub basically having a hub axle, a hub shell, a sprocket support body, a first ratchet member and a second ratchet member. The hub shell is rotatably mounted on a hub axle about a rotational axis. The sprocket support body is rotatably mounted on the hub axle to rotate around the rotational axis. The sprocket support body has an outer peripheral surface with a first helical spline. The first ratchet member has at least one first ratchet tooth and a second helical spline mating with the first helical spline. The second ratchet member has at least one second ratchet tooth mating with the at least one first ratchet tooth and a hub shell engagement portion that engages the hub shell. The outer peripheral surface of the sprocket support body has a guiding portion that guides the first ratchet member toward the hub shell while coasting.

Alley et al. in U.S. Pat. No. 9,599,172 ('172), whose disclosure is incorporated by reference, describe a releasable freewheel clutch which includes a ring gear and a driven member disposed within a bore of the ring gear. A plurality of pawls are each pivotally attached to the driven member and rotatable between a first position where each pawl is engaged with teeth of the ring gear and a second position where each pawl is disengaged with the teeth of the ring gear. The pawls are selective movable [sic] between the engaged and disengaged positions by a ring-shaped blocking element that is rotatably supported for rotation about the axis of rotation and relative to the driven member. Reference is currently made to FIG. 4, which shows two representations of a prior art free-coaster freewheel 12 similar to that described in the '172 reference. Apart from differences described below, driving member 3, driven member 4; axle 5a, and locking member (pawl) 6 of FIG. 4A are identical in notation, configuration, and functionality to that shown in FIGS. 1, 2A, and 3, and elements indicated by the same reference numerals and/or letters are generally identical in configuration, operation, and functionality as described hereinabove.

An additional and important free-coaster element is a damper 14, mounted onto axle 5a as shown in the figure. Damper 14 is maintained on axle 5a and has "selective movement", based on friction, as described further hereinbelow.

In view (a) free-coaster freewheel 12 is in a free coasting state, with driving member 3 stationary and the driven member moving either forward or backward as shown by the arrows. In this configuration, damper 14 contacts the pawls as shown in the figure to maintain the pawls in a non-engaged position, having no contact with driven member 4, which allows driven member 4 to rotate freely (coast) in both directions as shown.

In view (b), after a slack movement is made (as described hereinabove, related to free coasting freewheels) to advance the pawls (mounted on the driving member) and thus engage them with the driven member, yielding an engaged state of free-coaster freewheel 12. Damper 14 currently rotates forward, around stationary axle 5a (which is typically mechanically fixed to the bicycle/vehicle frame).

It is noted that in view (a) the damper does not rotate and is stationary relative to the axle. However, in the engaged state of view (b) the damper rotates about the axle, along with the driving and the driven members. Rotation of the damper about the axle yields two undesirable results, both due to friction:
- there is as an energy loss, effecting a deceleration of forward rotation; and
- more seriously, the damper is worn (actually "ground") as it rotates about the axle, which eventually results in damper failure—as the ground, worn damper cannot operate correctly (i.e., cannot be maintained stationary with the axle, relative to the pawls). Instead, the failed damper rotates together with the pawls from the start—and shifting cannot take place, which is equivalent to failure of the entire mechanism.

While various prior art free-coaster freewheels have various configurations of the damper, springs, spring pins and/or other damping mechanisms, there is a common "Achilles heel" of friction-based "selective movement" of the element serving for shifting between the 3 states.

There is therefore a need for a freewheel configuration having the functionality of free-coaster freewheels, including: free-coasting; engaged; and freewheeling states—and having solutions to the problems/limitations noted hereinabove, including, but not limited to: manual free-coasting activation, and addressing: excessive AOE and slow shifting; energy loss; excessive friction; concomitant excessive wear; and short service life.

SUMMARY OF THE INVENTION

According to the teachings of the current invention, there is provided an automatic free-coasting freewheel (AFF) having: a free-coasting state; an engaged state and a freewheeling state, the AFF comprising: a driving member; an inertial unit having lag/inertial characteristics; a driven member having at least one engagement surface; a freewheeling biasing member; and an axis of rotation defining an axle, the axis having an axial and a rotation direction; wherein the driving member, driven member and inertial unit are respectively coaxially mounted onto the axle and are rotatable thereupon, the driving member configured to controllably rotate relative to the inertia unit in the rotation direction, depending upon the free coasting, engaged, and freewheeling states; the driving and driven members respectively having respective angular velocities: $\omega_{driving}$ and $\omega_{driven}$; and respective angular accelerations $\alpha_{driving}$ and $\alpha_{driven}$; wherein the inertial unit is positioned between the driving member and the driven member, the inertial unit further comprising a suspension member configured with at least one set of: a locking member having a locking member shape and configuration, the locking member configured to engage and disengage the at least one engagement surface; and a free-coasting biasing member configured to act on the locking member to shift it away from the at least one engagement surface; wherein the inertial unit is configured to interact between the driving and the driven member to controllably maintain and to shift between the free-coasting, engaged, and freewheeling states, depending upon $\alpha_{driving}$ versus a threshold driving member angular acceleration value ($\alpha_{MIN}$) and $\omega_{DRIVEN}$ and $\omega_{DRIVING}$; and wherein $\alpha_{MIN}$ is adjustable by changes to the lag/inertial characteristics and configuration of the inertial unit; and wherein the freewheeling biasing member is configured to bias the locking member and the engagement surface in the freewheeling state.

Preferably, configuration of additional mechanical components includes at least one chosen from the list including: a clamping member assembly and a magnetic lag assembly. Most preferably, having a radial configuration, wherein the suspension member includes at least one set of suspension recesses formed therein, each set including: a locking member recess, in which the locking member is displaceable and configured to engage and disengage the at least one engagement surface; a free-coasting biasing member recess, in which a free-coasting biasing member is positioned; and a freewheeling biasing member recess-passage, in which the freewheeling biasing member is positioned. Typically, the locking member is configured to be radially displaced and the locking member shape and configuration are configured to decrease an angle of engagement (AOE) value. Most typically, the at least one engagement surface has teeth. Preferably, the at least one engagement surface is a race surface. Most preferably, having an axial configuration, wherein the driving member, the driven member, the locking member and the suspension member are coaxially mounted onto the axle, wherein the driving member and the suspension member are fixed in the axial direction, wherein the locking member and the suspension member are configured to be axially displaced and where the free-coasting and freewheeling biasing members are configured about the axle.

According to the teachings of the current invention, there is further provided a method of operating an automatic free-coasting freewheel (AFF) having: a free-coasting state; an engaged state; and a freewheeling state, The AFF comprising: a driving member; an inertial unit having lag/inertial characteristics; a driven member having at least one engagement surface; a freewheeling biasing member; and an axis of rotation defining an axle, the axis having an axial and a rotation direction; wherein the driving member, driven member, and inertial unit are respectively coaxially mounted onto the axle and are rotatable thereupon, the driving and driven members respectively having respective angular velocities: $\omega_{driving}$ and $\omega_{driven}$; and respective angular accelerations $\alpha_{driving}$ and $\alpha_{driven}$; and wherein the inertial unit is positioned between the driving member and the driven member, the inertial unit further comprising a suspension member configured with at least one set of: a locking member having a locking member shape and configuration, the locking member displaceable to engage and disengage the at least one engagement surface; and a free-coasting biasing member acting on the locking member to shift it away from the engagement surface; wherein the inertial unit interacts between the driving and the driven member and controllably maintains and automatically shifts between the free-coasting, engaged, and freewheeling states, depending upon $\alpha_{DRIVING}$ versus a threshold driving member angular acceleration value ($\alpha_{MIN}$) and $\omega_{DRIVEN}$ and $\omega_{DRIVING}$, according to the following steps: shifting from the free-coasting state to the engaged state when $\alpha_{DRIVING} \geq \alpha_{MIN}$ and when $\omega_{DRIVEN} \leq \omega_{DRIVING}$; shifting from the free-coasting state to the freewheeling state when $\alpha_{DRIVING} \geq \alpha_{MIN}$ and when $\omega_{DRIVEN} > \omega_{DRIVING}$; shifting from the engaged state to the freewheeling state when $\omega_{DRIVEN} > \omega_{DRIVING}$ and $\alpha_{DRIVING} \geq \alpha_{MIN}$; shifting from the freewheeling state to the engaged state when $\omega_{DRIVEN} \leq \omega_{DRIVING}$ and $\alpha_{DRIVING} \geq \alpha_{MIN}$; shifting from the engaged state to the free-coasting state when $\alpha_{DRIVING} \leq \alpha_{MIN}$ and $\omega_{DRIVING} < \omega_{DRIVEN}$; and shifting from the freewheeling state to the free-coasting state when $\alpha_{DRIVING} < \alpha_{MIN}$ and $\omega_{DRIVING} < \omega_{DRIVEN}$; wherein the freewheeling biasing member biases the locking member and the engagement surface in the freewheeling state. Preferably, whereby the locking member is radially displaceable. Most preferably, whereby the locking member and suspension member are axially displaceable and where the free-coasting and freewheeling biasing members are configured about the axle.

LIST OF FIGURES

The invention is described herein, by way of example only, with reference to the accompanying drawings, wherein:

FIGS. 2A and 2B are prior art schematic representations of exemplary freewheel designs, similar to the prior art freewheel of FIG. 1;

FIG. 3 is a prior art representation of the prior art freewheel of FIG. 1, illustrating an Angle of Engagement (AOE) in radially-engaged freewheels:

FIGS. 6A and 6B are an exploded isometric representation of the inertial unit and an isometric representation of the driving member of FIG. 5, in accordance with embodiments of the current invention;

Figure 1:
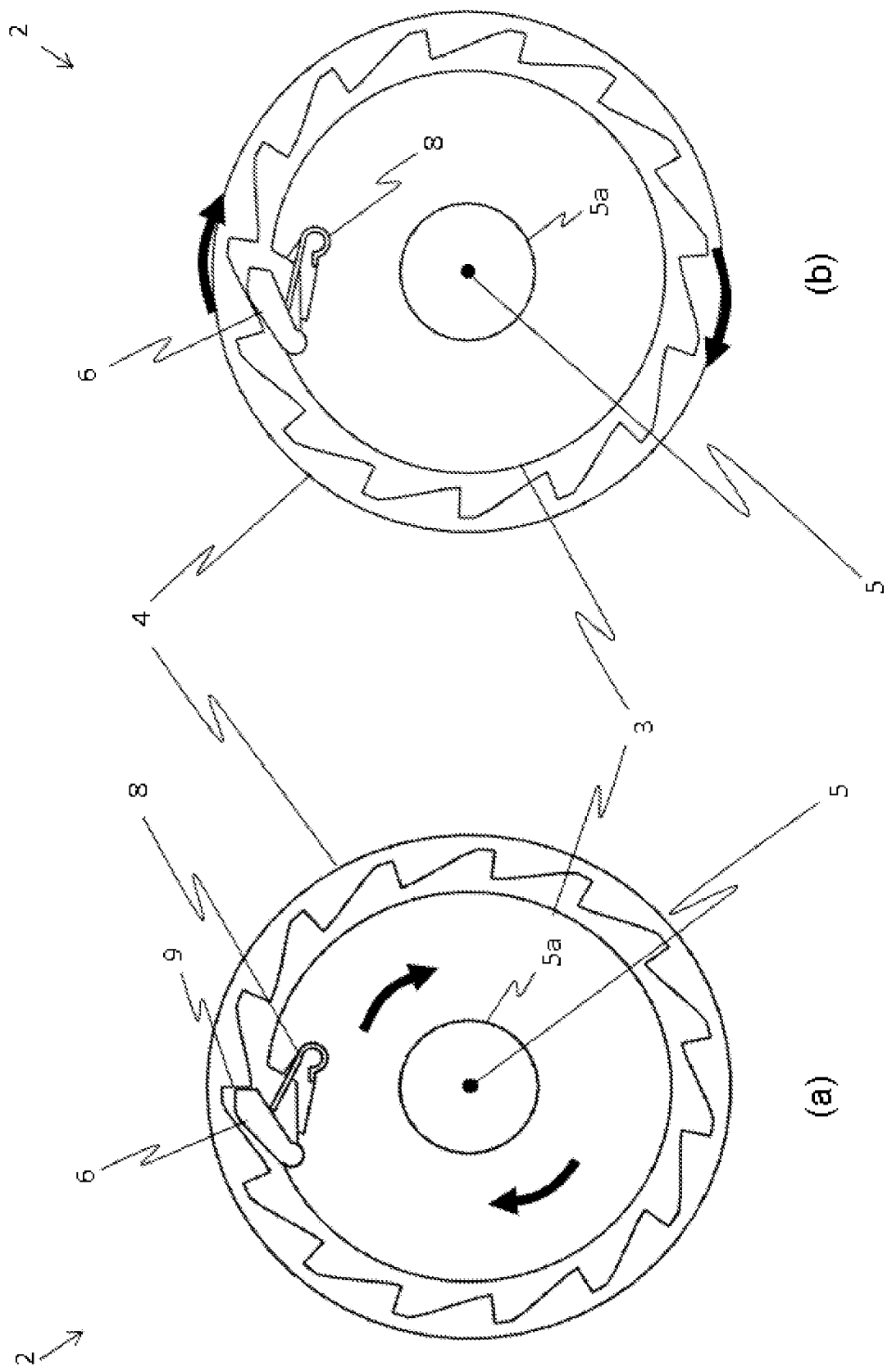
FIG. 1 is a prior art representation of a freewheel, in an engaged state (a) and in a freewheeling state (b), comprising: a driving member; a driven member; a common axis of rotation; and a locking member and a biasing member.
Figure 2B:
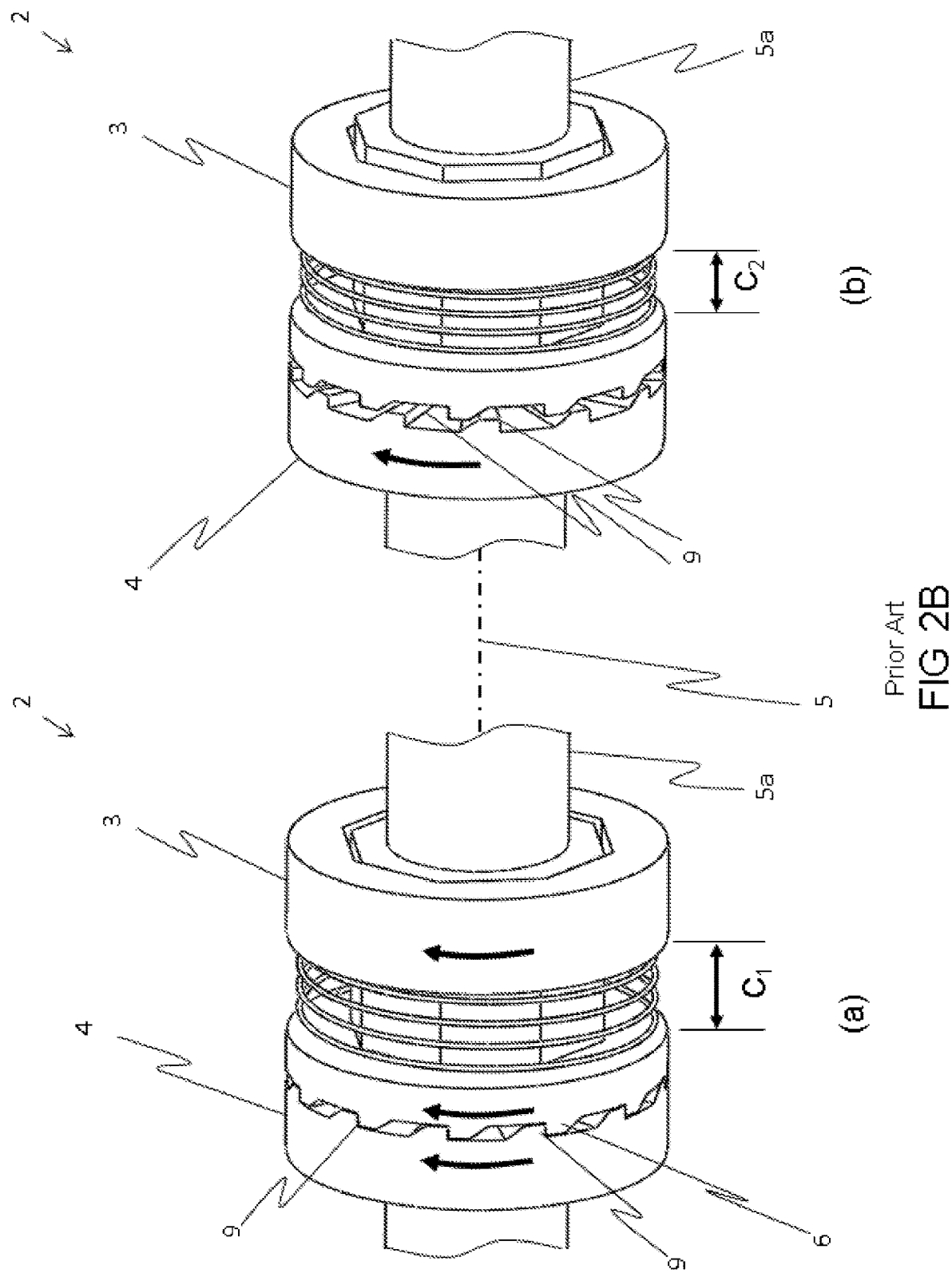
Figure 4:
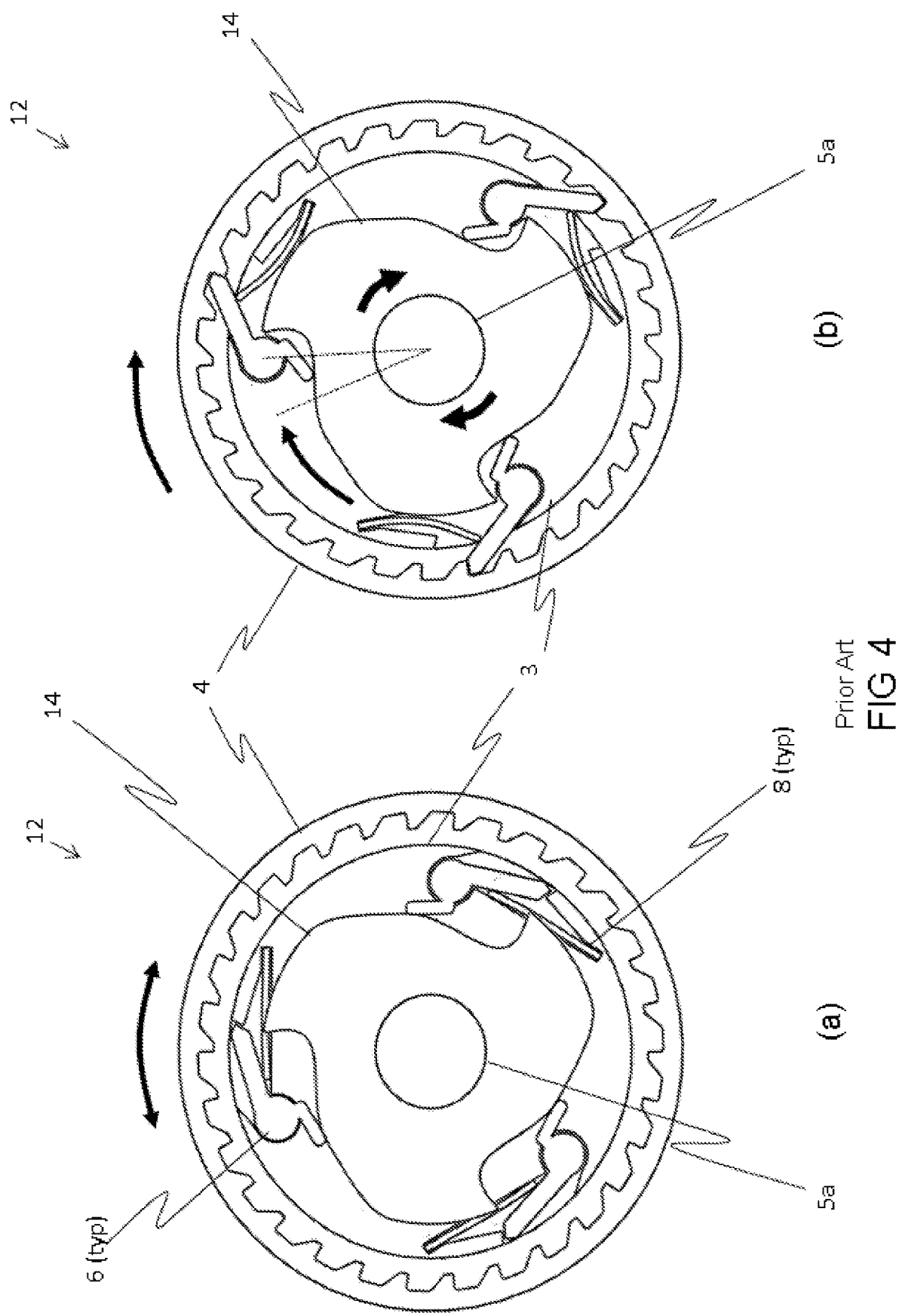
FIG. 4 shows two representations of a prior art radial free-coaster freewheel similar to that described in the '172 reference.
Figure 5:
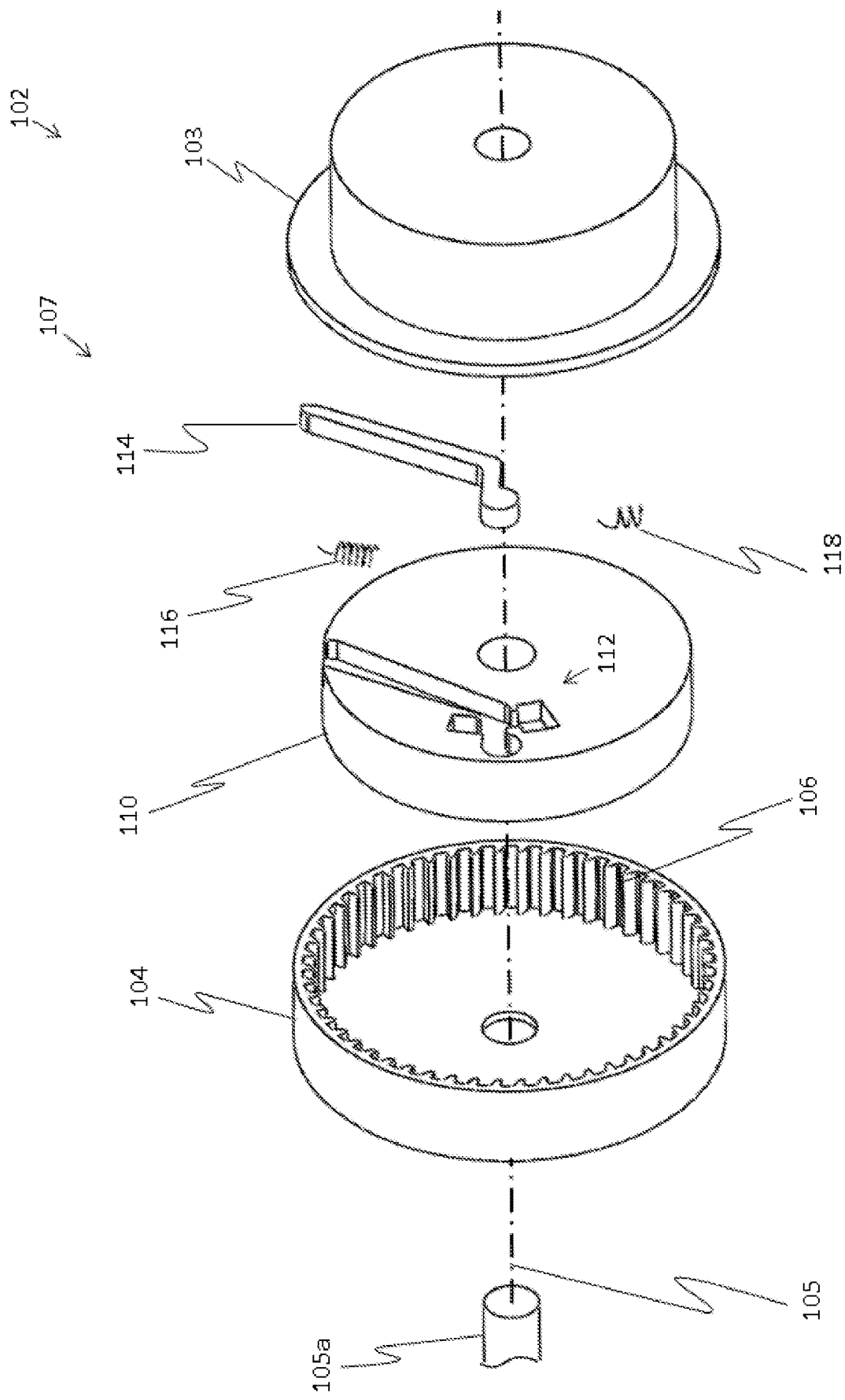
FIG. 5 is a schematic, exploded, isometric representation of an exemplary radial automatic free-coasting freewheel (AFF), in accordance with embodiments of the current invention.
Figure 7:
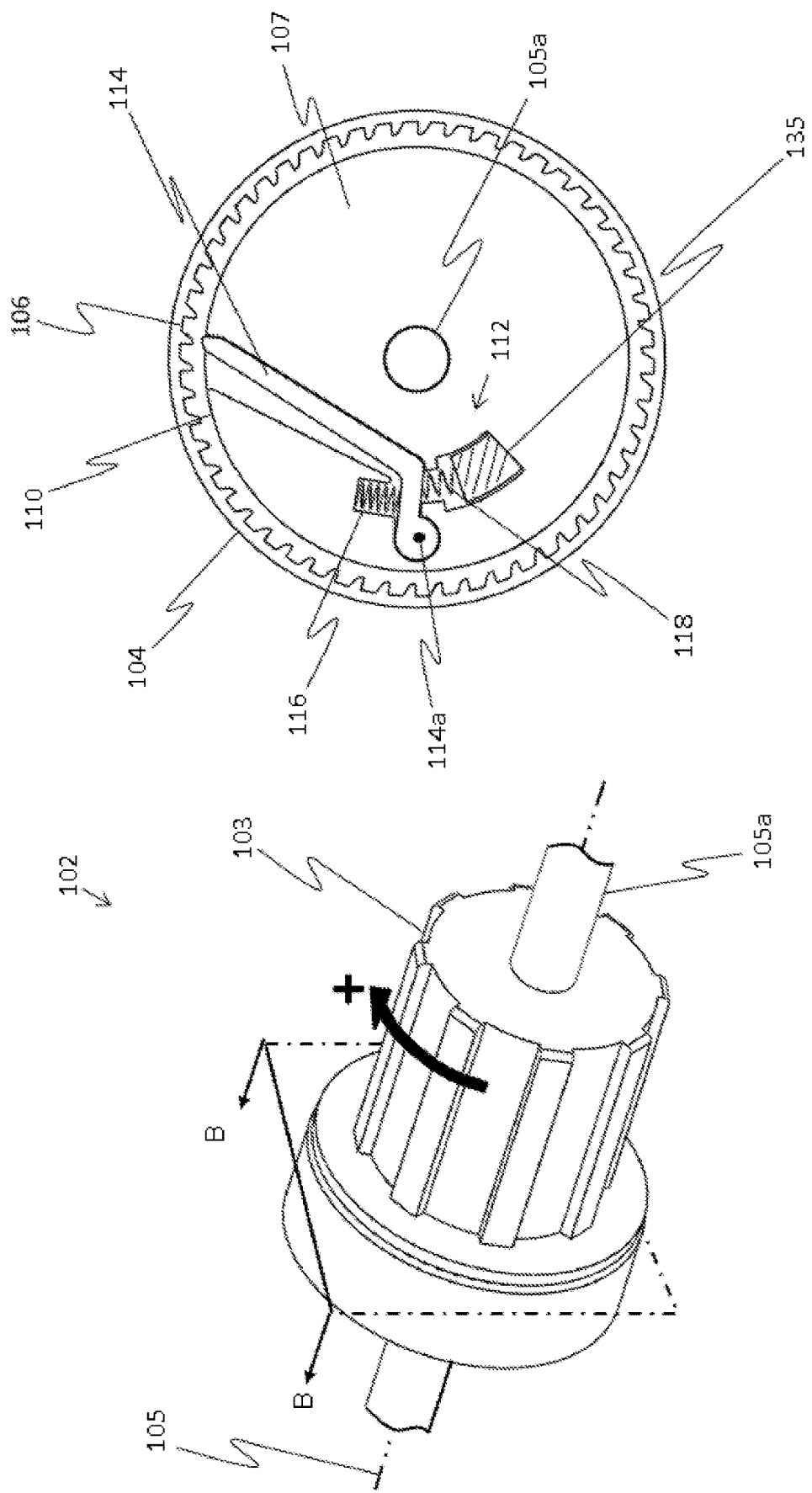
FIG. 7 is an isometric view of an assembled AFF (shown in exploded view in FIG. 5) and a sectional view B-B thereof, respectively, in accordance with embodiments of the current invention.
Figure 12:
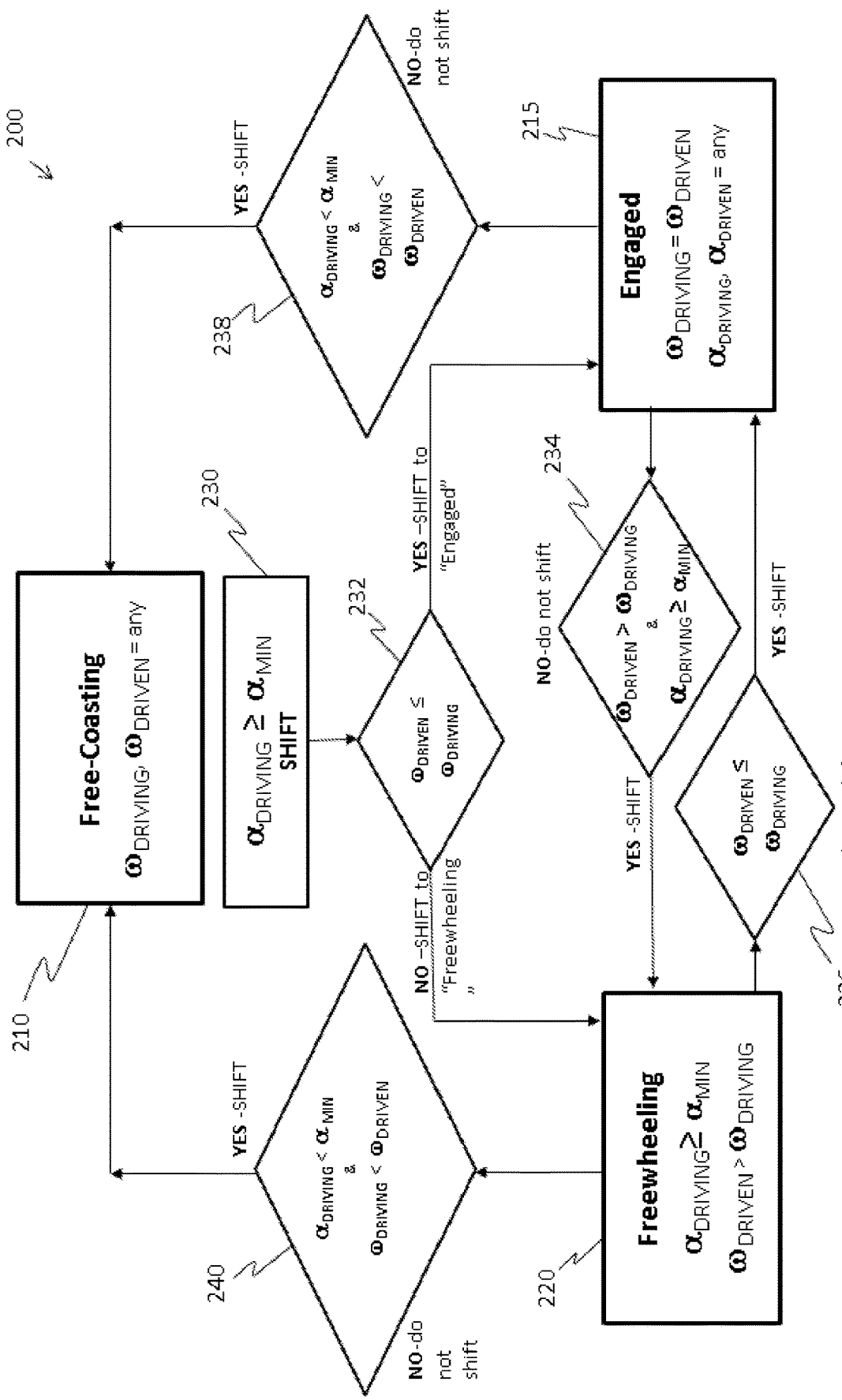
Figure 13A:
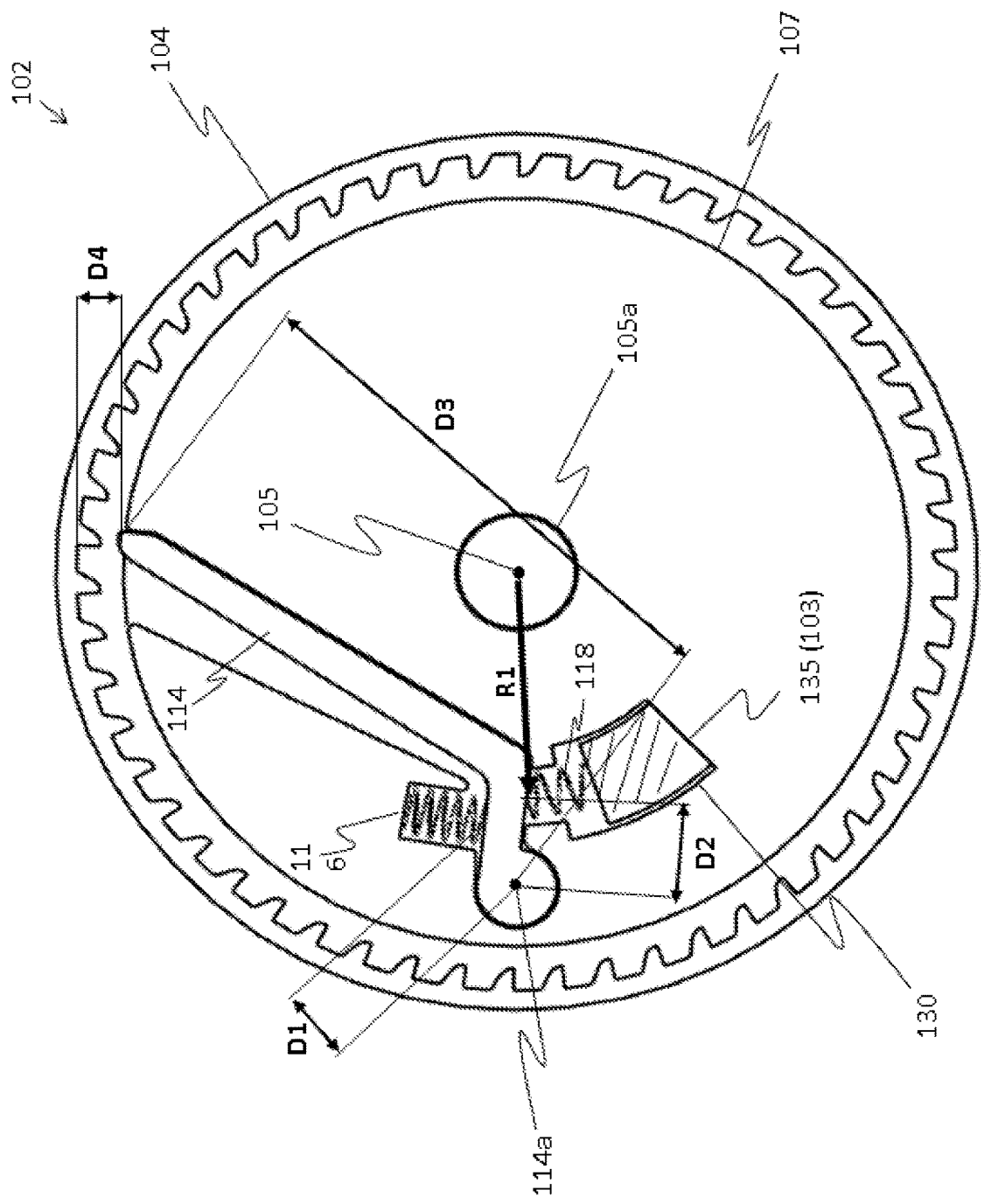
Figure 13B:
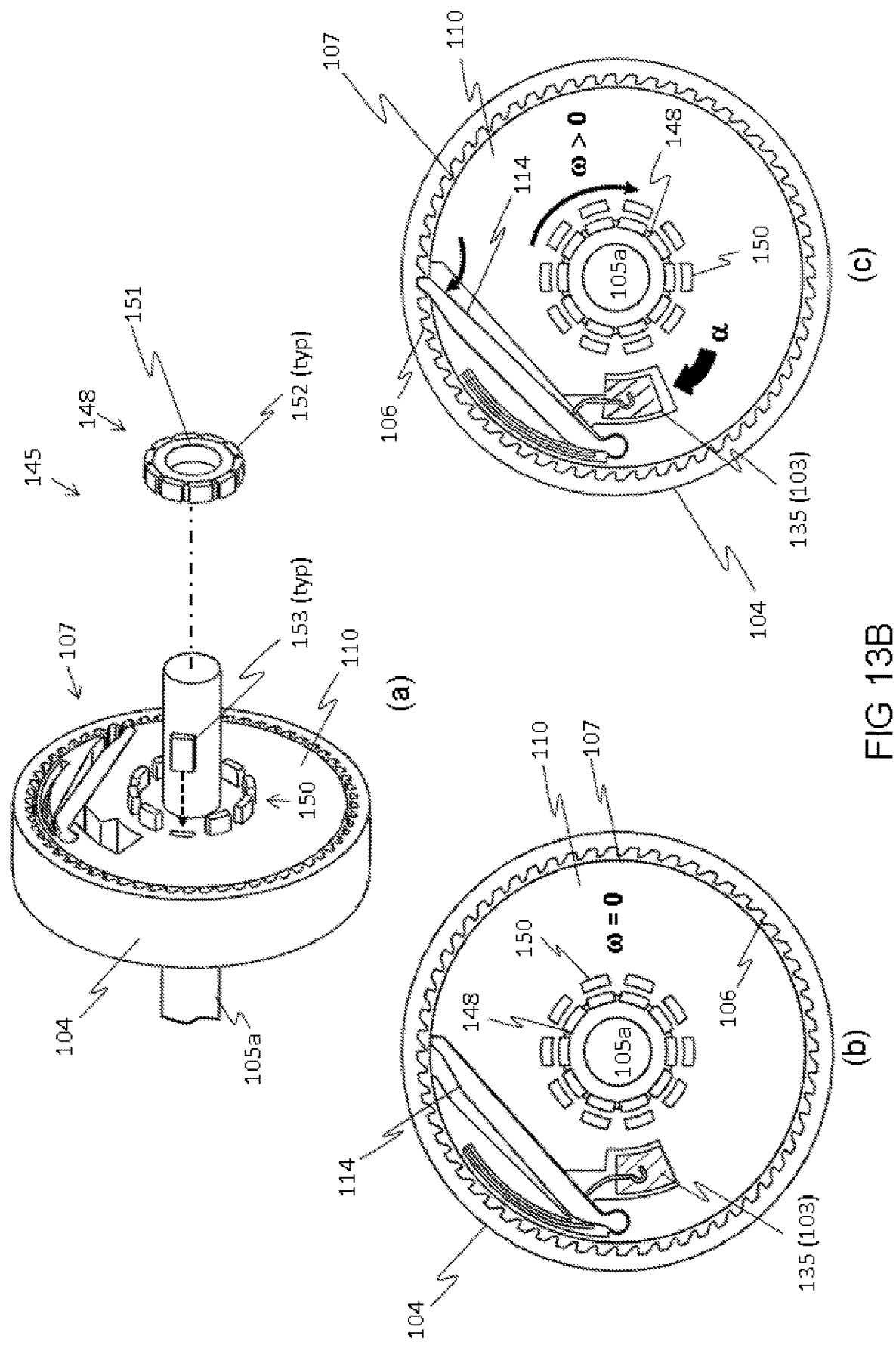
Figure 13C:
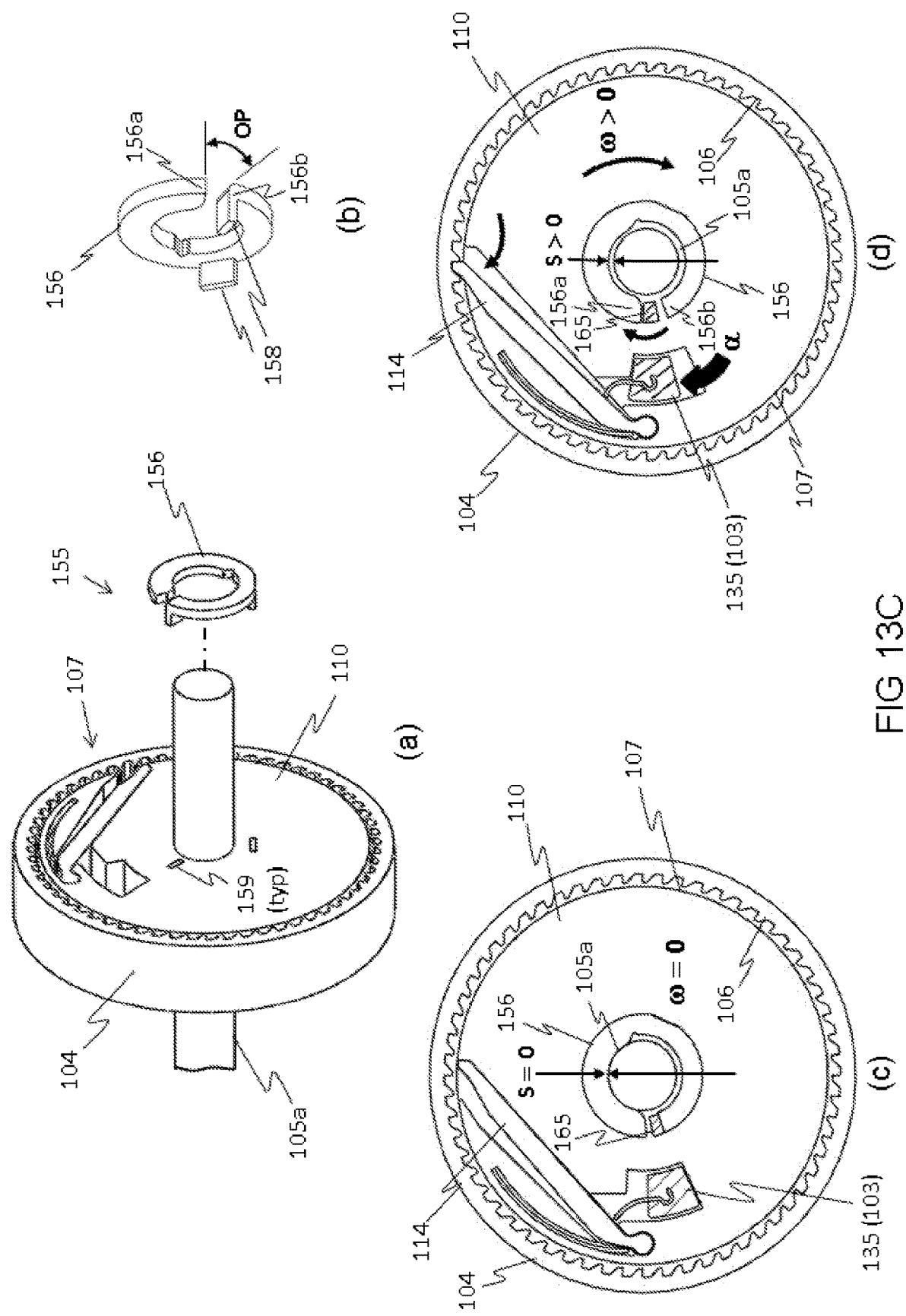
Figure 14B:
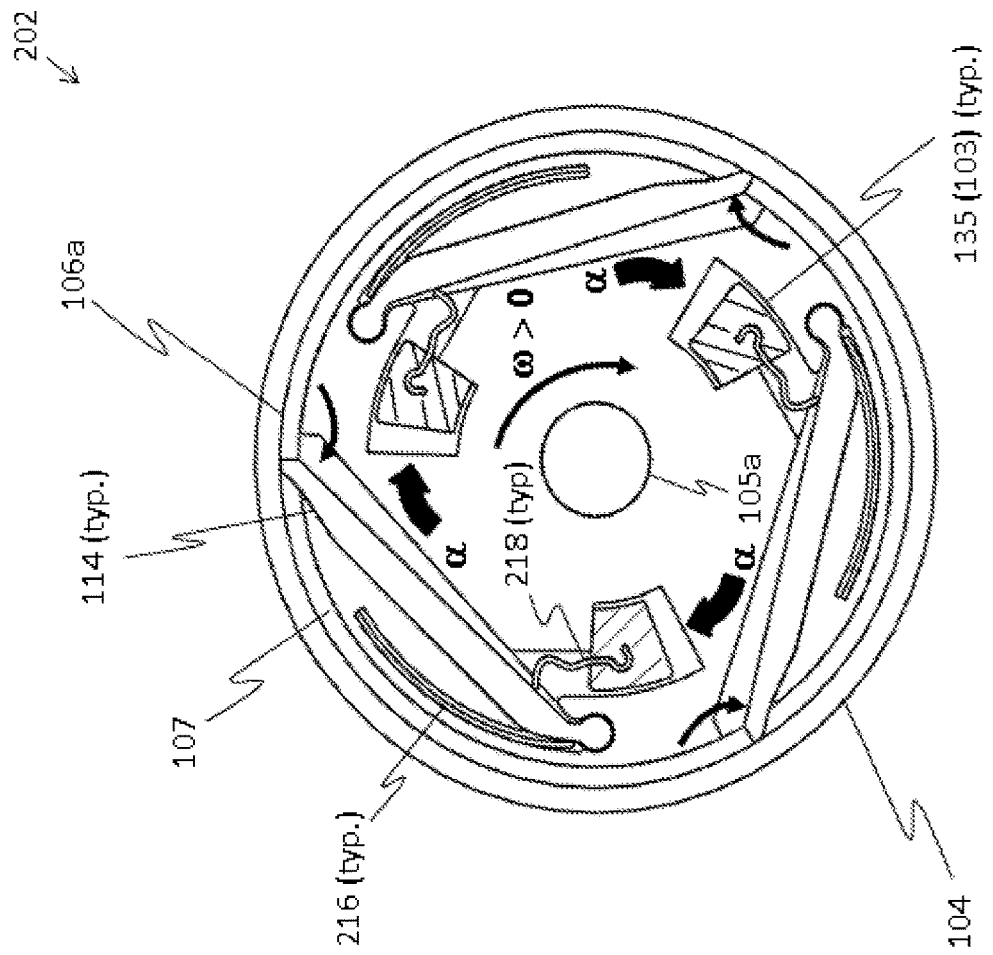
Figure 15A:
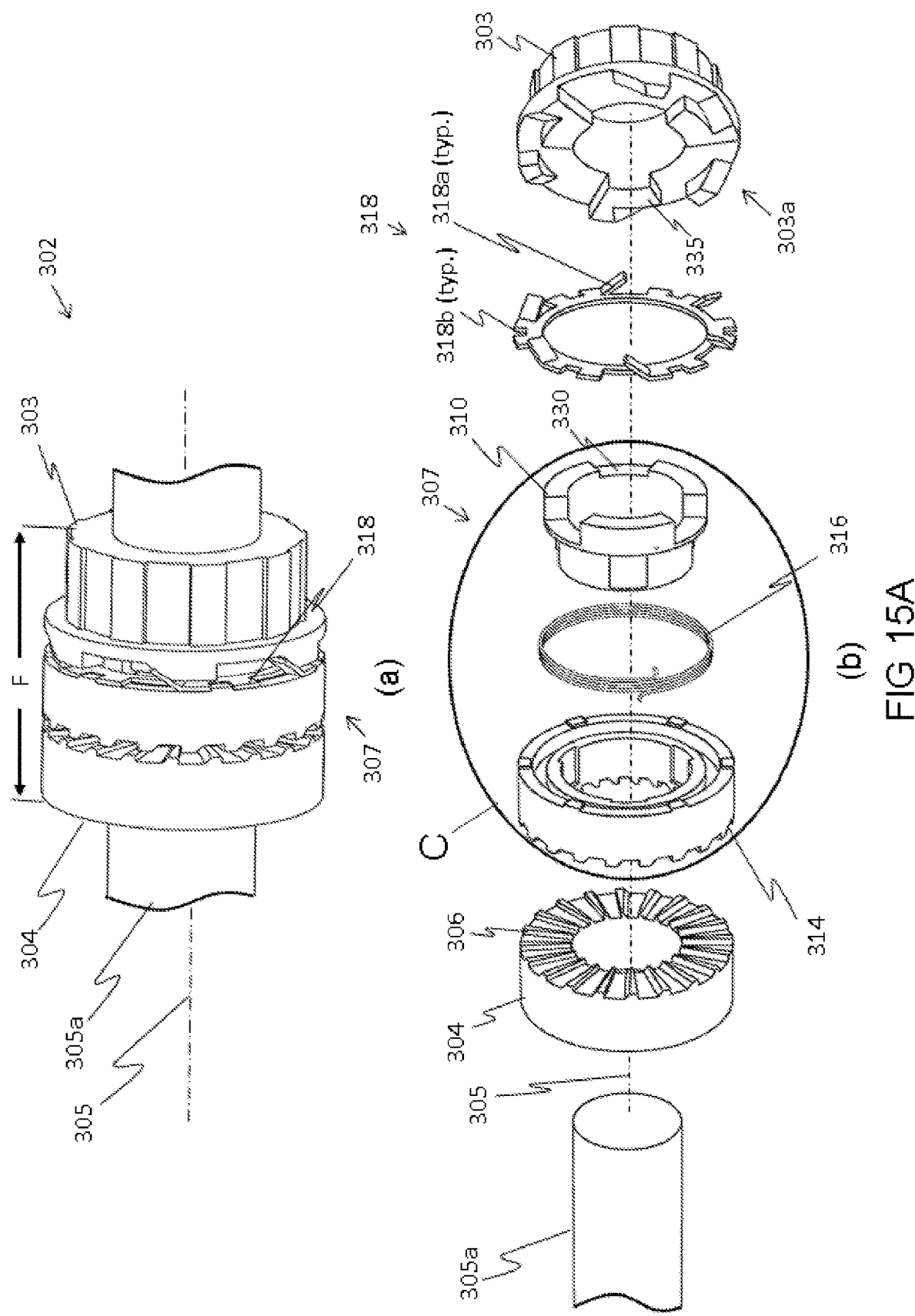
Figure 15B:
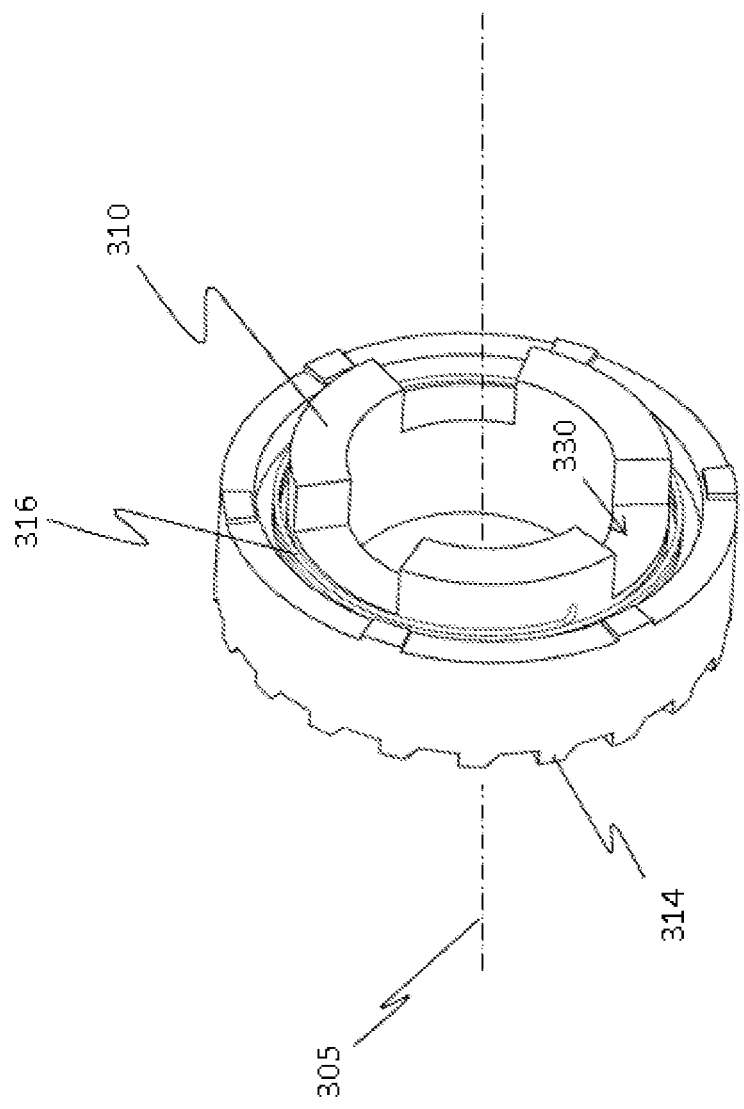
Figure 16:
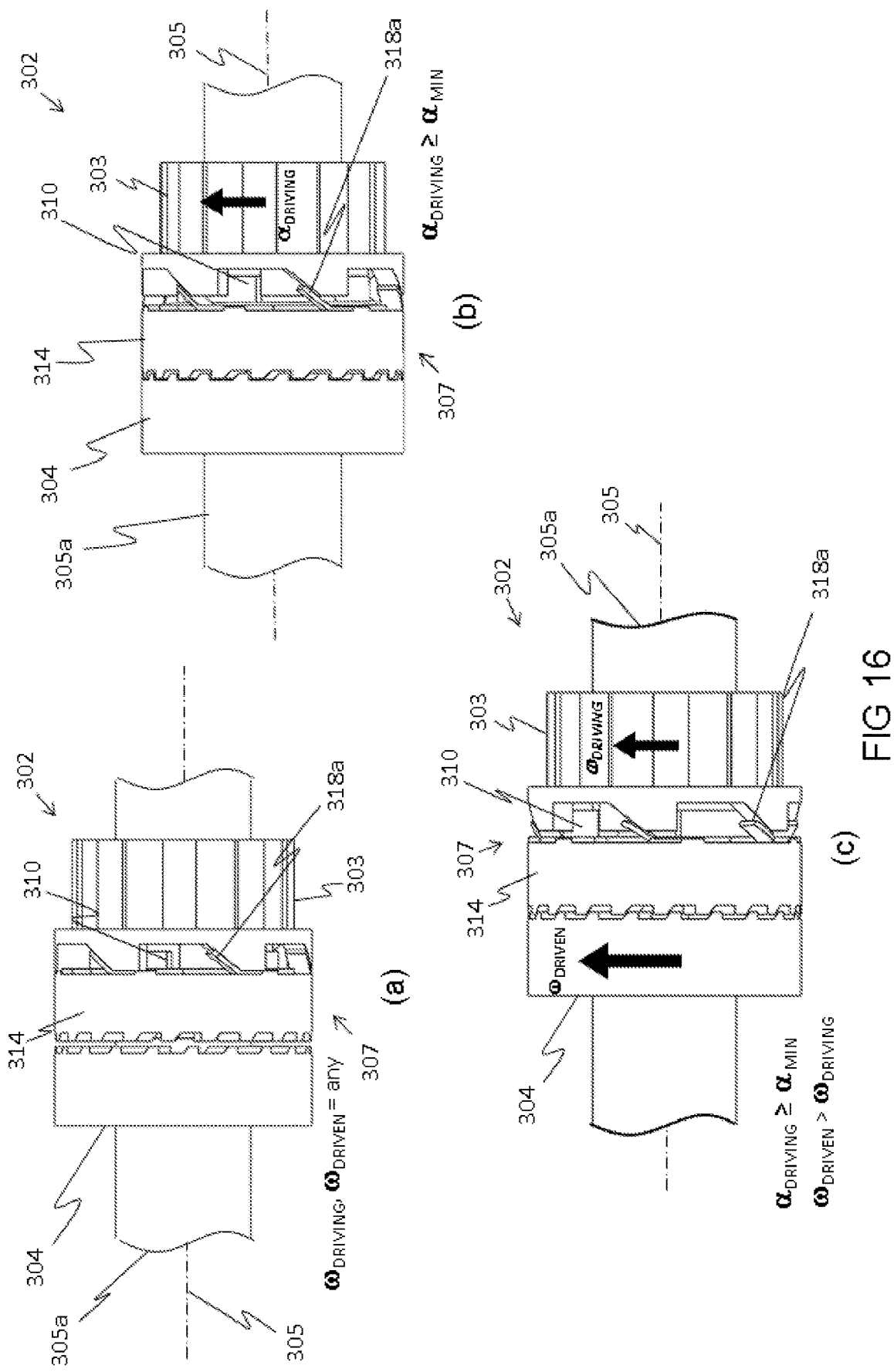
Figure 17:
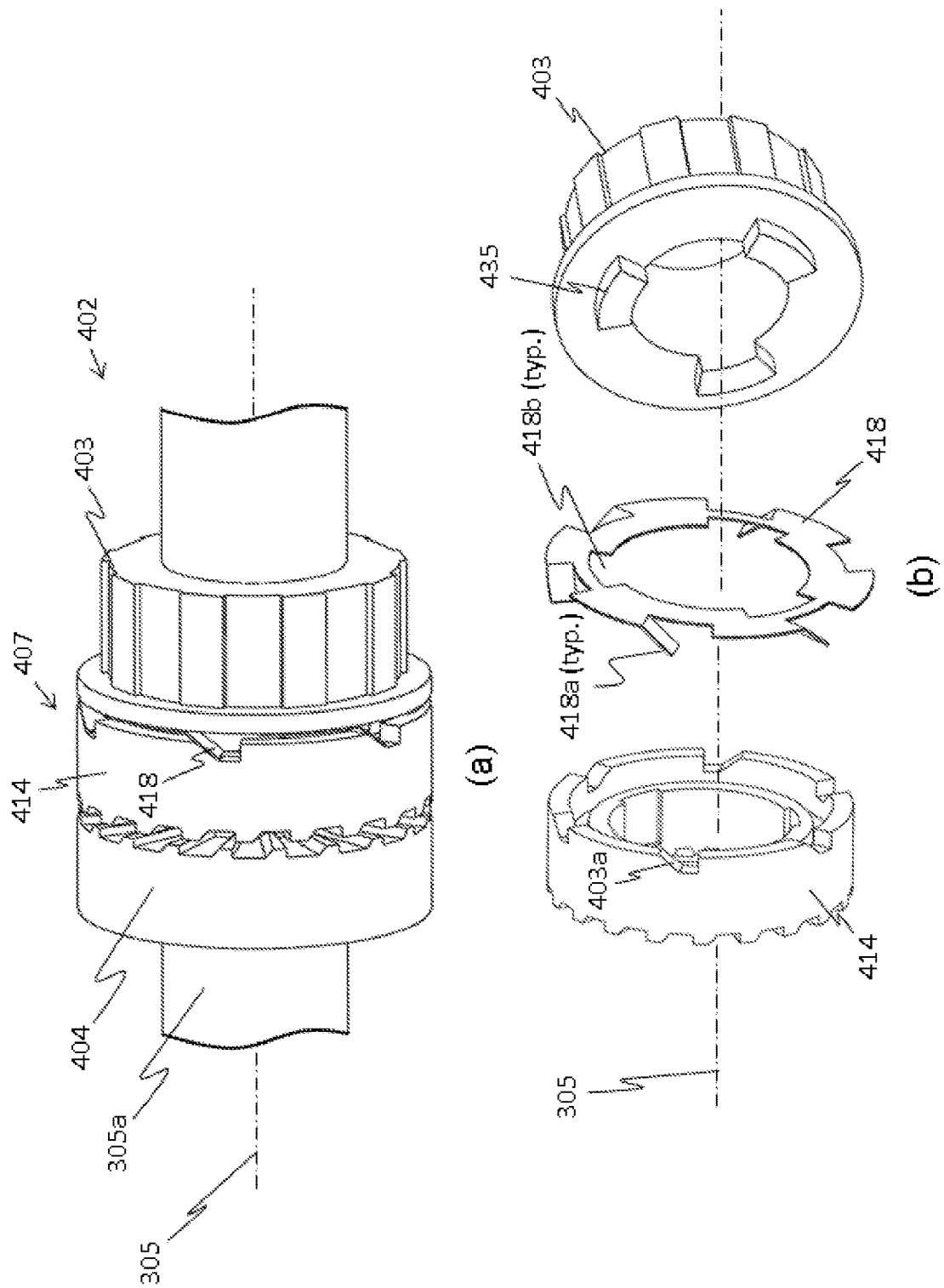
Figure 18:
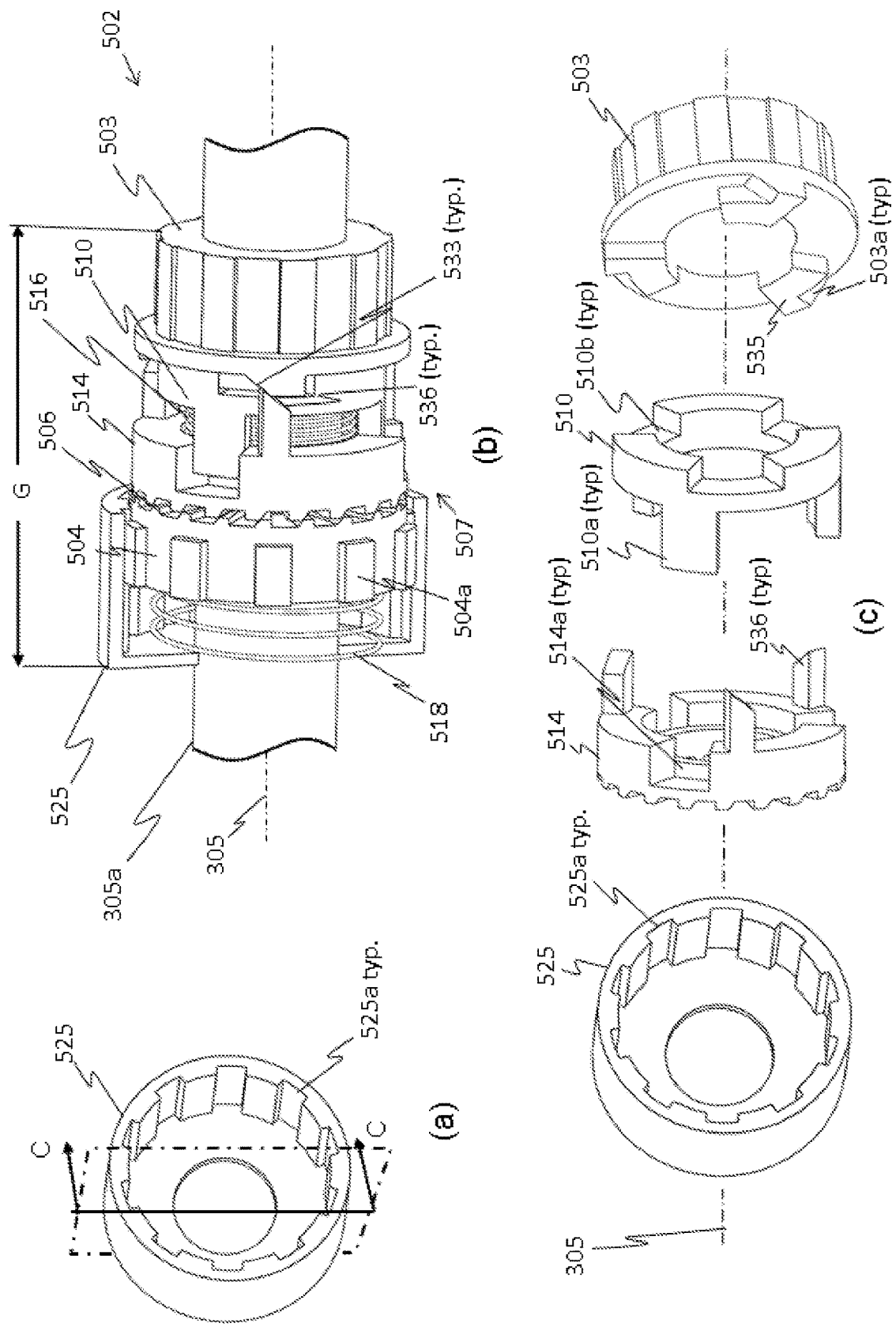

FIGS. 8A-8B, 9A-9C, 10A-10B, and 11A-11B, which are sectional views of various configurations, corresponding to operational states of the AFF, as shown in FIG. 7, in accordance with embodiments of the current invention;

FIG. 12 is a logic flow diagram, identifying the three states of operation of the AFF and summarizing respective conditions for shifting between the three states, in accordance with embodiments of the current invention;

FIG. 13A is an enlarged view of the AFF, as shown in the sectional view FIG. 7, including three dimensions D1, D2, and D3, in accordance with embodiments of the current invention;

FIG. 13B is an exploded view of the driven member, the axis, and the inertial unit of the AFF shown in FIG. 5 and the AFF shown in the sectional view of FIG. 7, including a magnetic lag assembly, in accordance with embodiments of the current invention;

FIG. 13C is an exploded view of the driven member, the axis, and the inertial unit of the AFF shown in FIG. 5 and the AFF shown in the sectional view of FIG. 7, including a clamping member assembly, in accordance with embodiments of the current invention;

FIGS. 14A and 14B are sectional views of a race configuration AFF (which is similar to the AFF shown in FIG. 7) including a detailed view "B" thereof, in accordance with embodiments of the current invention;

FIGS. 15A and 15B are, respectively, assembled and exploded isometric views of an AFF, having an axial configuration, and a detailed view of part of the AFF, in accordance with embodiments of the current invention;

FIG. 16 shows three views of the AFF of FIGS. 15A and 15B, in respective free-coasting, engaged, and freewheeling states, in accordance with embodiments of the current invention;

FIG. 17 shows, respectively assembled and exploded partial isometric views of an AFF, which is an alternate configuration of the AFF of FIGS. 15A and 15B, in accordance with embodiments of the current invention;

FIG. 18 shows three views including: an isometric view of a rotating cap (view "a"), an isometric, partially sectional view of an AFF (view "b") in freewheeling state; and a exploded isometric view of some parts of the AFF (view "c"), in accordance with embodiments of the current invention;

FIG. 19 shows an assembled and exploded isometric view of an inertial unit (views "a" and "b") and an isometric, partially sectional view of an AFF (view "c"), in accordance with embodiments of the current invention; and FIG. 20 shows three views of the AFF of FIG. 19, in respective free-coasting, engaged, and freewheeling states, in accordance with embodiments of the current invention.

DETAILED DESCRIPTION OF DRAWINGS

Embodiments of the current invention relate to the field rotational-based devices with freewheels and specifically to an automatic free-coasting freewheel (AFF). Furthermore, embodiments of the current invention provide for an innovative freewheel configuration, which is automatic, durable, and which has fast engagement features—all as described hereinbelow.

In the specification and claims which follow, the terms "acceleration" and "deceleration", when applied to a freewheel with respective objects having a respective angular velocity ($\omega$) and respective angular acceleration ($\alpha$) are applied. Additionally, the term "torque" ($\tau$), yielding angular acceleration $\alpha$, is used, according to the Newtonian equation, $\tau=I\alpha$, in which I is the moment of inertia, as known in the art. In the specification and claims which follow, a minimum or threshold, value of any rotational variable ($\omega$, $\alpha$, $\tau$) is expressed by the subscript "MIN", i.e. $\omega_{MIN}$, $\alpha_{MIN}$, and $\tau_{MIN}$. In similar fashion, a variable attributed to a specific part of an AFF (for example, the driving member) uses the specific part name in the subscript and is expressed, for example, as $\omega_{DRIVING}$.

Regarding sense, the term "forward" (positive value) is used hereinbelow interchangeably to mean "clockwise". Likewise, "backward" (negative value) is used interchangeably hereinbelow with "counterclockwise". Therefore, clockwise angular acceleration and clockwise torque have a positive sense and counterclockwise angular acceleration and counterclockwise torque have negative values.

Reference is currently made to FIG. 5, which is a schematic, exploded, isometric representation of an exemplary radial automatic free-coasting freewheel (AFF) 102, in accordance with embodiments of the current invention. AFF 102 includes: a driving member 103; a driven member 104; a common axis of rotation 105 defining an exemplary axle 105a; engagement surfaces 106 of the driven member, and an inertial unit 107. Axle 105a is typically mechanically fixed to the vehicle/bicycle (not shown in the figure), whereas driving member 103, driven member 105, and inertial unit 107 are typically separately mounted onto axle 105a using bearings, as known in the art (not shown in the current figure for simplicity)—allowing each element to rotate freely, relative to the axle. When assembled, AFF 102 operation takes place due to the interactions of the driving member, driven member, and inertial unit—as described hereinbelow.

Inertial unit 107 further includes; a suspension member 110: a suspension recesses 112: a locking member 114: a free-coasting biasing member 116 (also referred to hereinbelow as a "non-engagement biasing member 116"): and a freewheeling biasing member 118. Both biasing members are shown in the present figure as exemplary coil-compression springs, but as described hereinbelow, the biasing members may have alternate configurations, such as, but not limited to: a leaf spring; an alternate spring configuration, magnets; and any similar structure/device having similar mechanical spring-like/elasticity behavior.

Figure 6B:
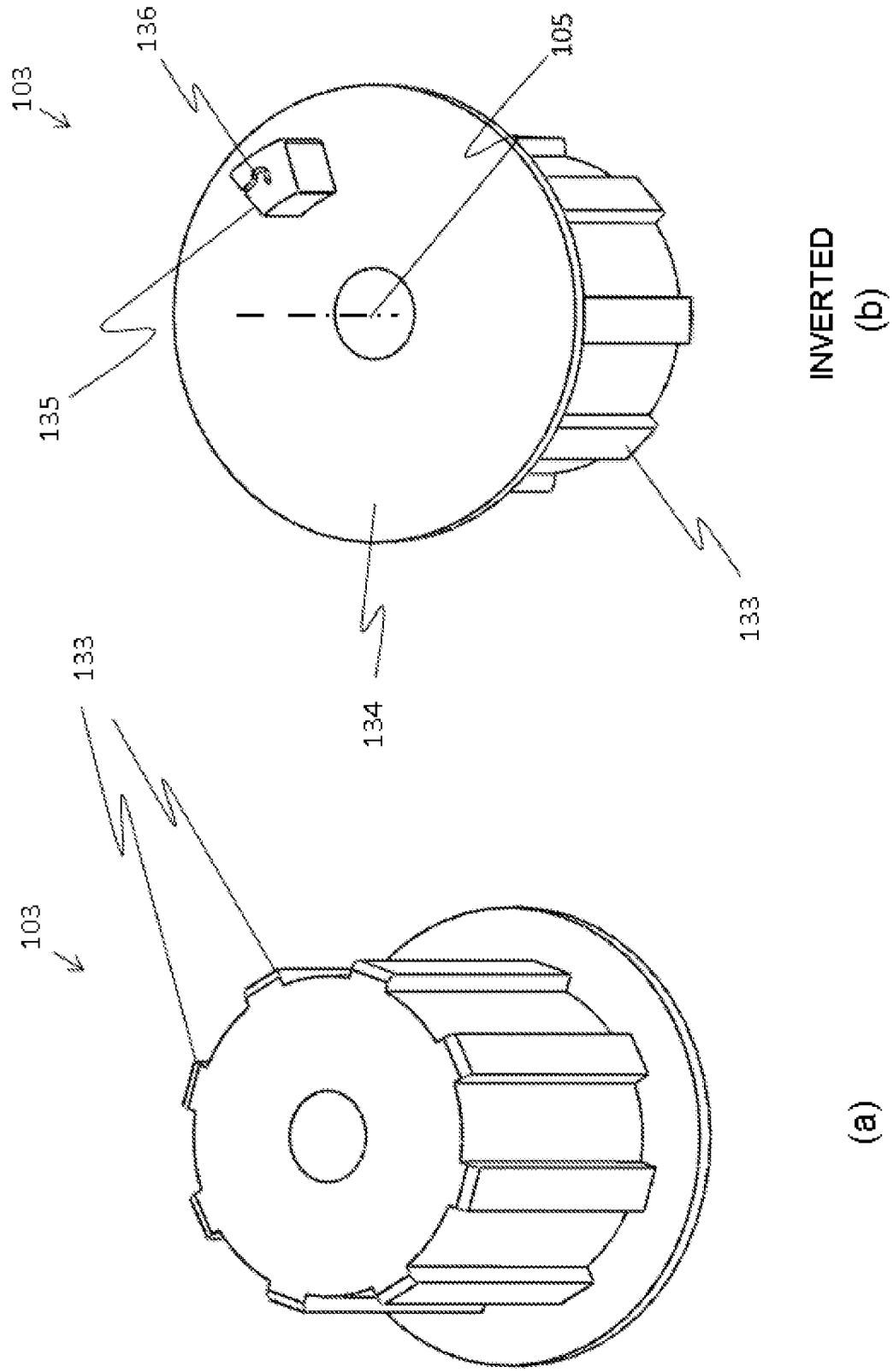

Reference is currently made to FIGS. 6A and 6B, which are an exploded isometric representation of inertial unit 107 and an isometric representation of driving member 103 of FIG. 5, respectively, in accordance with embodiments of the current invention. In addition to the items described in FIG. 5 hereinabove, suspension recesses 112 includes: a locking member recess 124; and a free-coasting biasing member recess 126; and a biasing extension tooth recess-passage 130. It is noted that free-coasting biasing member 116 and freewheeling biasing member 118 shown in the current figure have an optional non-coil spring configuration, with respective, corresponding recesses having corresponding shapes (differing from those shown in FIG. 5). However, the functionality of the two biasing members (also called "spring elements") is similar, namely to respectively bias locking member 114 and an extension tooth (introduced hereinbelow in FIG. 6B) to controllably enable the inertial unit to maintain and/or shift between operational states in AFF 102—as further described hereinbelow.

As shown in the figure, locking member recess 124 is formed to maintain locking member 114 therein, at a first end 124a of locking member recess, having a rounded recess, as shown, mating with and allowing only rotational movement of locking member 114 about a rotational axis 114a, as shown in the figure. A second end 124b of locking member recess 124 is wider than the corresponding mating dimension of locking member 114. As a result, when mated within locking member recess 125, locking member 114 may rotate at the first end about rotational axis 114 a and be arcuately displaced at the second end, allowing locking member 114 at the second end to be controllably alternately extended past and withdrawn within the circumference of inertial unit 107. The arcuate displacement described hereinabove enables the inertial unit, and specifically locking member 114 to controllably engage and disengage engagement surfaces 106 of the driven member (ref FIG. 5), as additionally described hereinbelow.

In FIG. 6B, views (a) and (b) show splines 123, which may be optionally configured on the lateral side of driving member 103, as shown in the figure, to enable the driving member to be optionally linked with another member (not shown in the figure) such as, but not limited to: a gear and a toothed axle. View (b) of FIG. 6B shows an inverted view of view (a) of driving member 103. In view (b) it can be seen that the driving member has a substantially flat mating surface 134 and a biasing extension tooth 135 having a truncated arcuate cross-sectional shape, as shown in the figure. Additionally, shown in FIG. 6B, view (b) is an optional recess 136 in biasing extension tooth 135, in which to anchor freewheeling biasing member 118, shown in FIG. 6A.

When driving member 103 is assembled in position upon the axle and in close proximity to inertial unit 107 (as shown in FIG. 5) biasing extension tooth 135 fits into biasing extension tooth recess-passage 130 of inertial unit 107 enabling the driving member to rotate with respect to the inertia unit in a controlled (limited) manner, with freewheeling biasing member 118 positioning inside the biasing extension tooth recess, between the biasing extension tooth and locking member 114, as shown in subsequent figures, hereinbelow. In the configuration described hereinabove, although flat mating surface 134 of driving member 103 does not contact inertial unit 107, the driving member contacts the inertial unit in a controlled manner through biasing extension tooth 135, which is biased by freewheeling biasing member 118.

Reference is currently made to FIG. 7, which is an isometric view of an assembled AFF (shown hereinabove in exploded view in FIG. 5)—view (a)—and a sectional view B-B thereof—view (b)—respectively, in accordance with embodiments of the current invention. Apart from differences described below, AFF 102, driving member 103, driven member 104; axle 105 $a$, and inertial unit 107 of FIG. 5 (hereinabove) are identical in notation, configuration, and functionality to that shown in FIG. 7, and elements indicated by the same reference numerals and/or letters are generally identical in configuration, operation, and functionality as described hereinabove. In view (a), the arrow having a "+" indication shows a positive rotational direction of the AFF.

As noted previously free-coaster freewheels, in general, and specifically AFF 102, have three states of operation:
1. free-coasting state;
2. engaged state; and
3. freewheeling state.

AFF 102 is configured to allow durable, efficient, automatic, and fast shifting between the three states, as described hereinbelow. Sectional view (b) of FIG. 7, serves as a basic view of the AFF, in which to present and discuss the following series of figures showing various configurations of driving member 103, driven member 104, and inertial unit 107 (as shown by biasing extension tooth 135). The following series of figures are grouped according to four scenarios to describe operation and shifting between the three aforementioned states of operation of AFF 102.

Reference is currently made to FIGS. 8A-8B, 9A-9C, 10A-10B, and 11A-11B, which correspond to four scenarios of the AFF, shown in sectional views, as seen in FIG. 7, showing the three states of AFF operation, in accordance with embodiments of the current invention. Apart from differences described below, driving member 103, driven member 104; axle 105 $a$, and inertial unit 107, as shown by biasing extension tooth 135 of FIG. 7 (hereinabove) are identical in notation, configuration, and functionality to that shown in FIGS. 8A-8B, 9A-9C, 10A-10B, and 11A-11B, and elements indicated by the same reference numerals and/or letters are generally identical in configuration, operation, and functionality as described hereinabove. Furthermore, to underscore that biasing tooth extension 135 is a mechanical extension of driving member 103, in the figures the biasing tooth extension is indicated as "135 (103)" in the referenced figures.

Figure 8B:
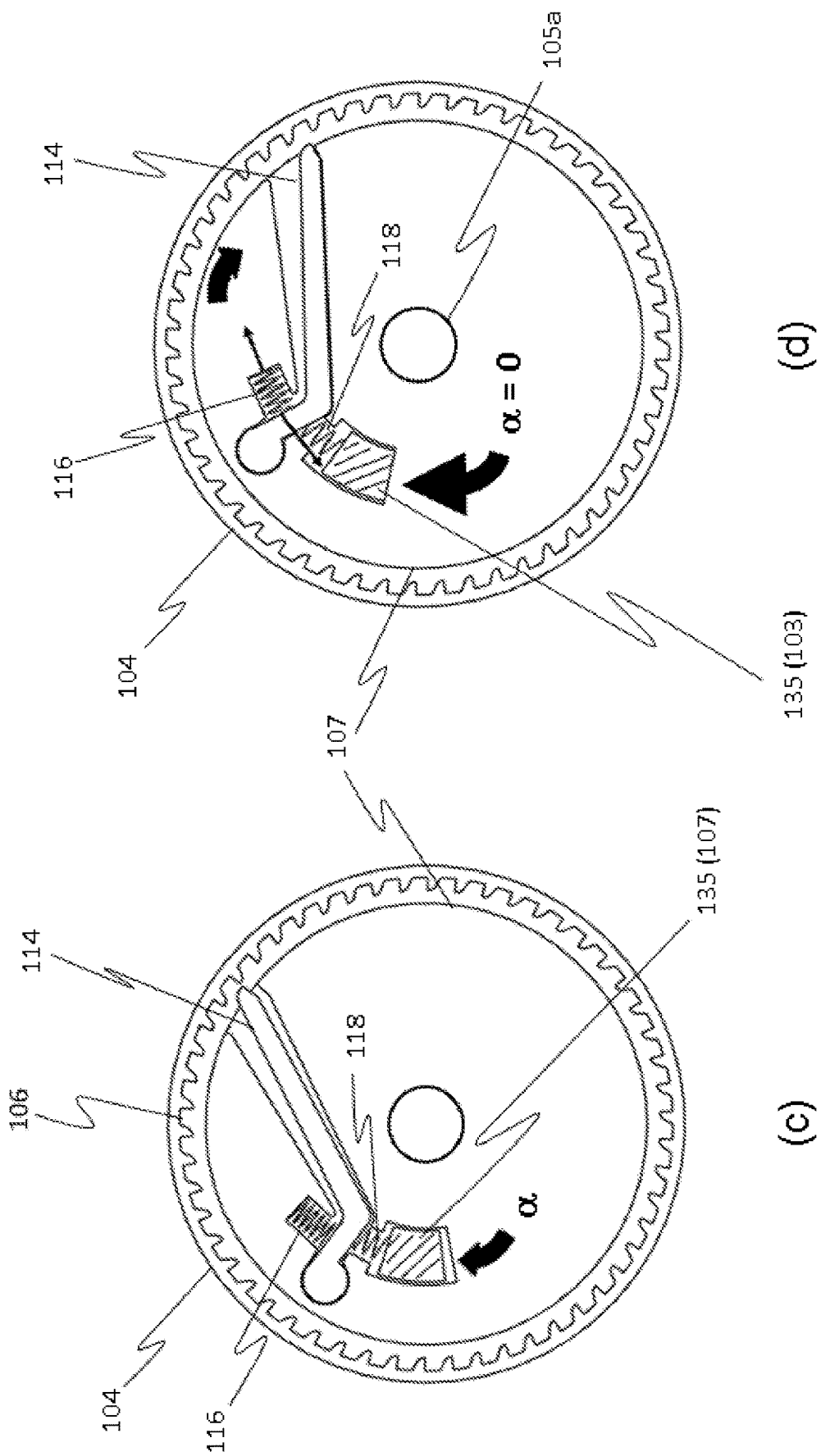

FIGS. 8A-8B represent a first scenario, in which the AFF begins and remains in the free-coasting state (views a, b, c, and d). In view (a) the driven member is free to rotate forward and backward, not contacting other parts, which exhibit no movement.

In view (b) the driving member is presently rotated forward, and has a positive value of $\alpha$, since, previously, $\omega=0$. Currently, let us assume that $\alpha < \alpha_{MIN}$, where $\alpha_{MIN}$ and other "MIN" values are determined, based on operational and structural characteristics of the AFF. (A discussion of changing operational and structural characteristics of the AFF is presented hereinbelow, related to additional figures.)

In the current case, the inertial unit, due to its moment of inertia, I, "resists" a change in $\omega$. Resultingly, the biasing extension tooth moves forward, as indicated in the figure by the arrow, and biasing extension tooth 135 begins to compress freewheeling biasing member 118 and to partially displace locking member 114—but not enough to shift, because $\alpha < \alpha_{MIN}$.

Continuing with scenario 1, in view (c), as the driving member continues having an acceleration $\alpha < \alpha_{MIN}$, compression of the freewheeling biasing member is not sufficient to affect a shift (displace the locking member) and the inertial unit rotates together with the driving member, both having the same angular velocity=$\omega$. The freewheel remains in the free-coasting state. If driving member continues to have an acceleration $\alpha < \alpha_{MIN}$, the driving member can increase its $\omega$ and rotate faster than the driven member, and the AFF remains in the free-coasting state.

In view (d) the driving member is no longer accelerated ($\alpha=0$) and rotates forward at constant $\omega$. Then non-engagement biasing member 116 becomes uncompressed (shown schematically in the figure by the two arrows pointing in opposing directions), serving to bias locking member 114 away from engagement surfaces 106 and to further push freewheeling biasing member 118, which in turn pushes upon biasing extension tooth 135 (and driving member 103) in a negative direction (and the suspension member in a positive direction).

Figure 9A:
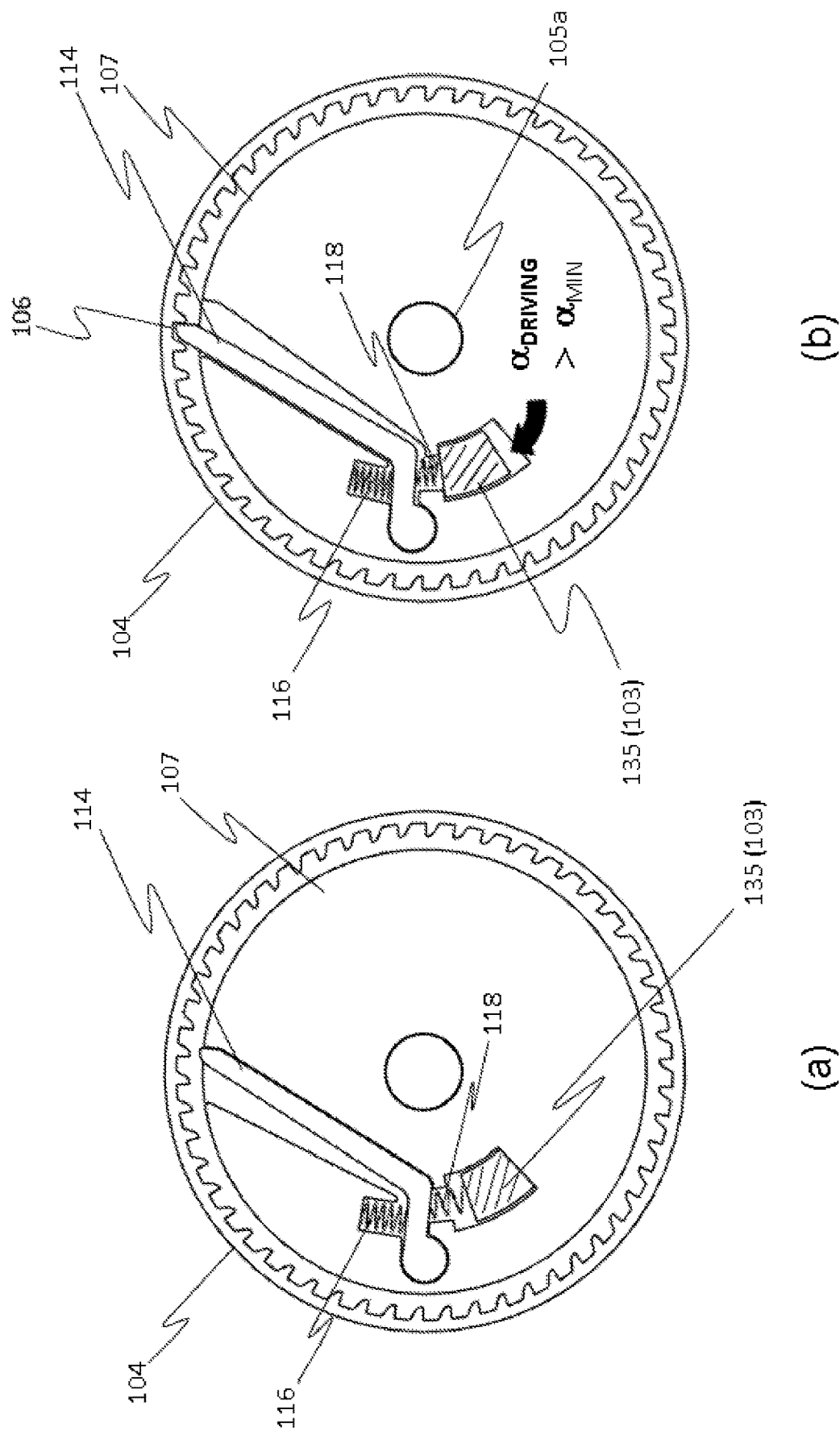
Figure 9C:
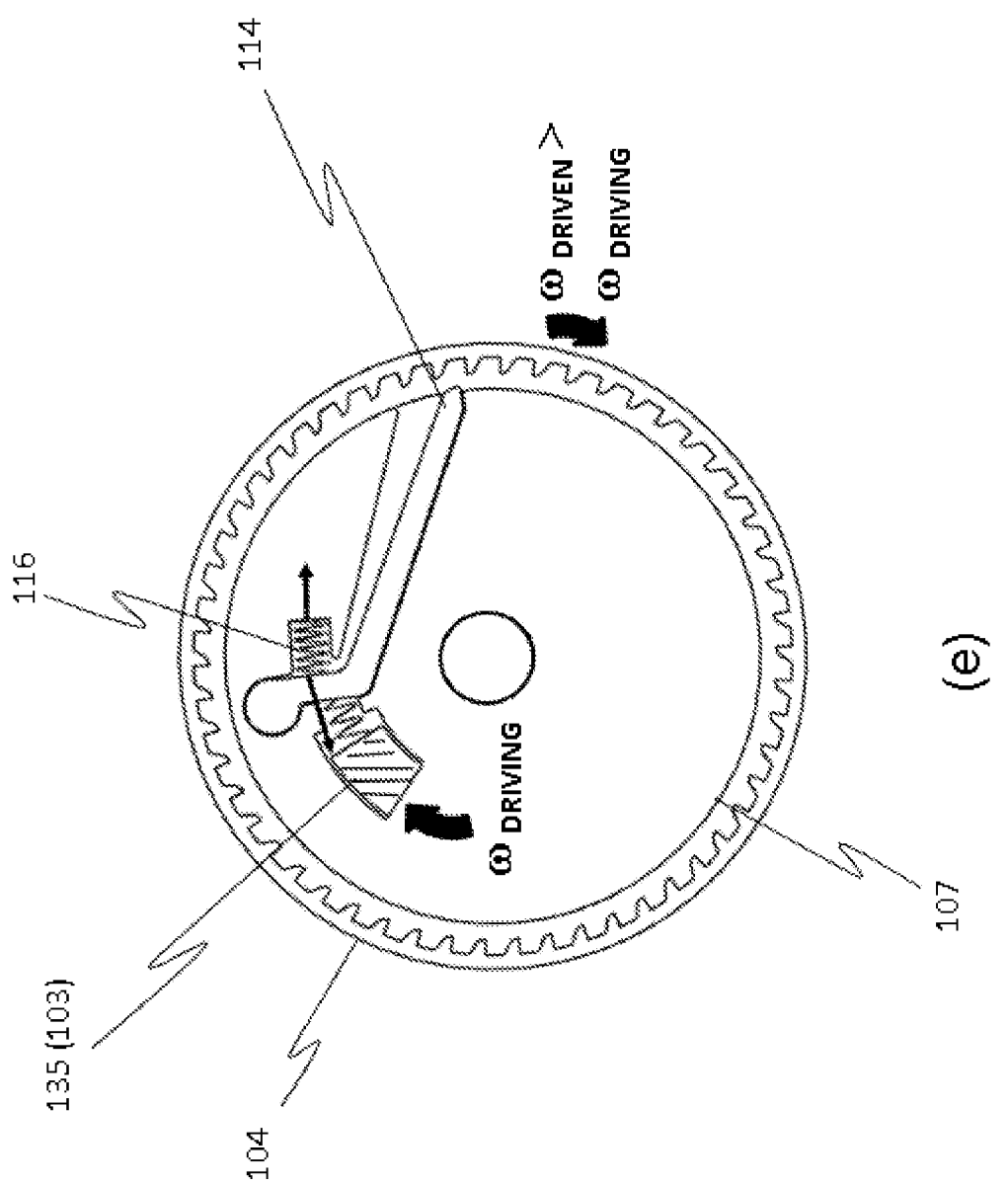

FIGS. 9A-9C represent a second scenario, which in FIG. 9A begins with the AFF in the free-coasting state, view (a) and then the AFF shifts into the engaged state, view (b), remaining in the engaged state in FIG. 9B views (c) and (d), and shifting back to the free-coasting state in FIG. 9C view (e). In view (a), driven member 104 is free to rotate in both directions (free-coasting state) and has no contact with the inertial unit nor the driving member.

In view (b), which shows the engaged state, the driving member is rotated forward with $\alpha_{DRIVEN} \geq \alpha_{MIN}$.

In view (c), the AFF remains in the engaged state, under two conditions:
1. driving member 103 (including biasing extension tooth 135) have sufficient angular acceleration $\alpha$ to counteract an opposing force of non-engagement biasing member 116; and,
2. $\omega_{DRIVEN}$ ($\omega$ of the driven member) is not higher than $\omega_{DRIVING}$ ($\omega$ of the driving member)—as is common in all freewheels, as previously described hereinabove.

The driving member may rotate at constant positive $\omega$ and/or may have a positive $\alpha$. Alternatively, the driving member may remain stationary if rotation of the driven member is impeded by drag or friction, for example.

In view (d), which shows a continued engaged state, driven member 104, inertial unit 107, and driving member all rotate together forward, having $\omega = \omega_{DRIVING}$ (indicated in the figure as $\omega > 0$). In this configuration, non-engagement biasing member 116 is biased by the locking member being engaged in engagement surfaces 106 (i.e. being engaged with driven member 104) and the non-engagement biasing member cannot expand/decompress, to allow a shift into the free-coasting state. A shift to the free-coasting state can only occur if locking member 114 is disengaged from engagement surfaces 106, by movement of the driven member forward relative to the locking member—and thereby enabling non-engagement biasing member 116 to expand. The configuration and shift described hereinabove is equally applicable in a radial/tooth configuration of AFF 102 having engagement surfaces 106 and of an axially configured AFF, having a flat race engagement surface as described further hereinbelow.

View (e) shows a free-coasting state, with the driving member having no acceleration and rotating forward, but with $\omega_{DRIVEN} > \omega_{DRIVING}$. This happens when either one or both of the following occur:

1. $\omega_{DRIVING}$ is reduced; or
2. $\omega_{DRIVEN}$ increases, due to an external acceleration (gravity, wind, etc.) and causing a shift to the free-coasting state.

Figure 10A:
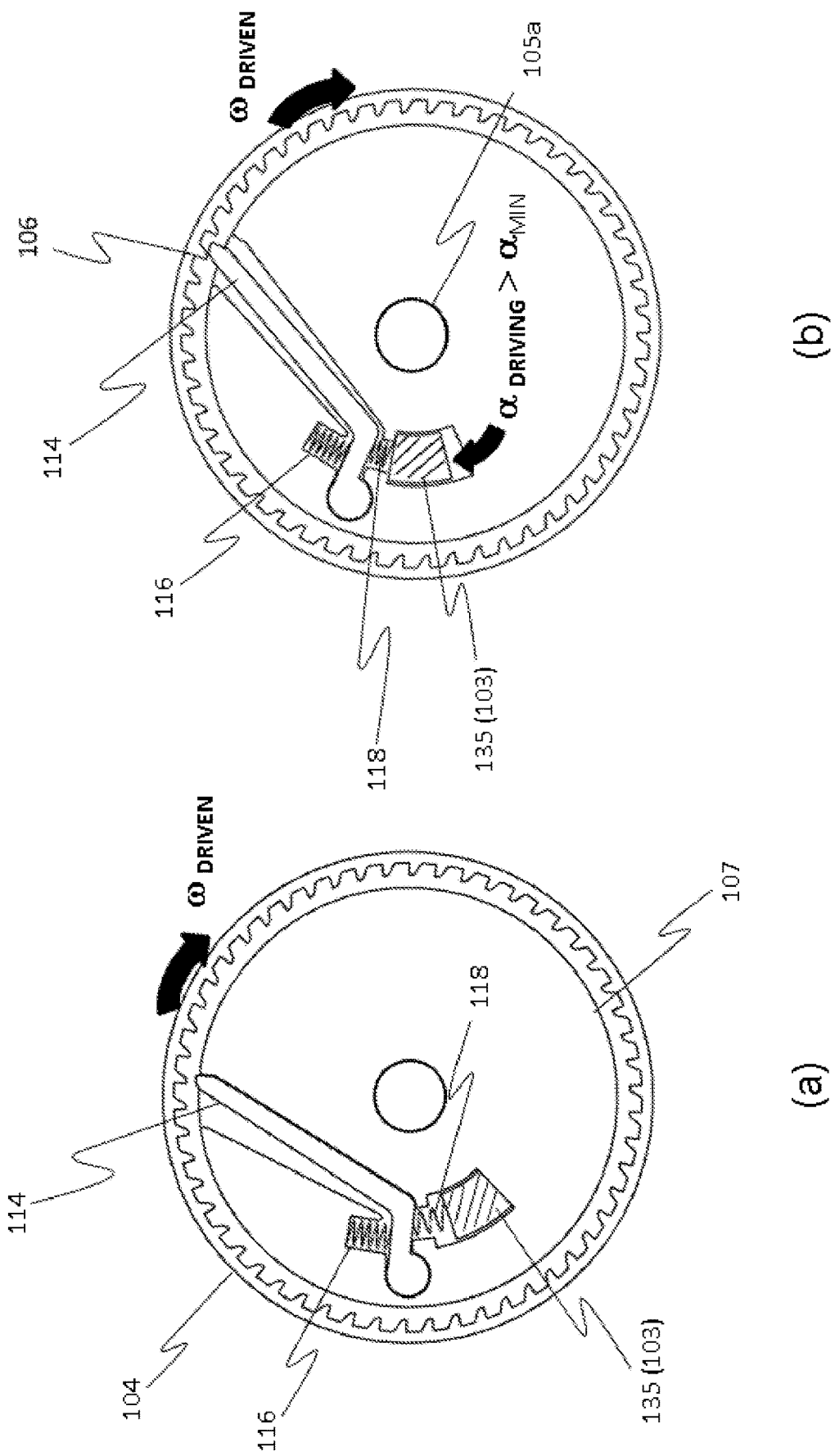
Figure 10B:
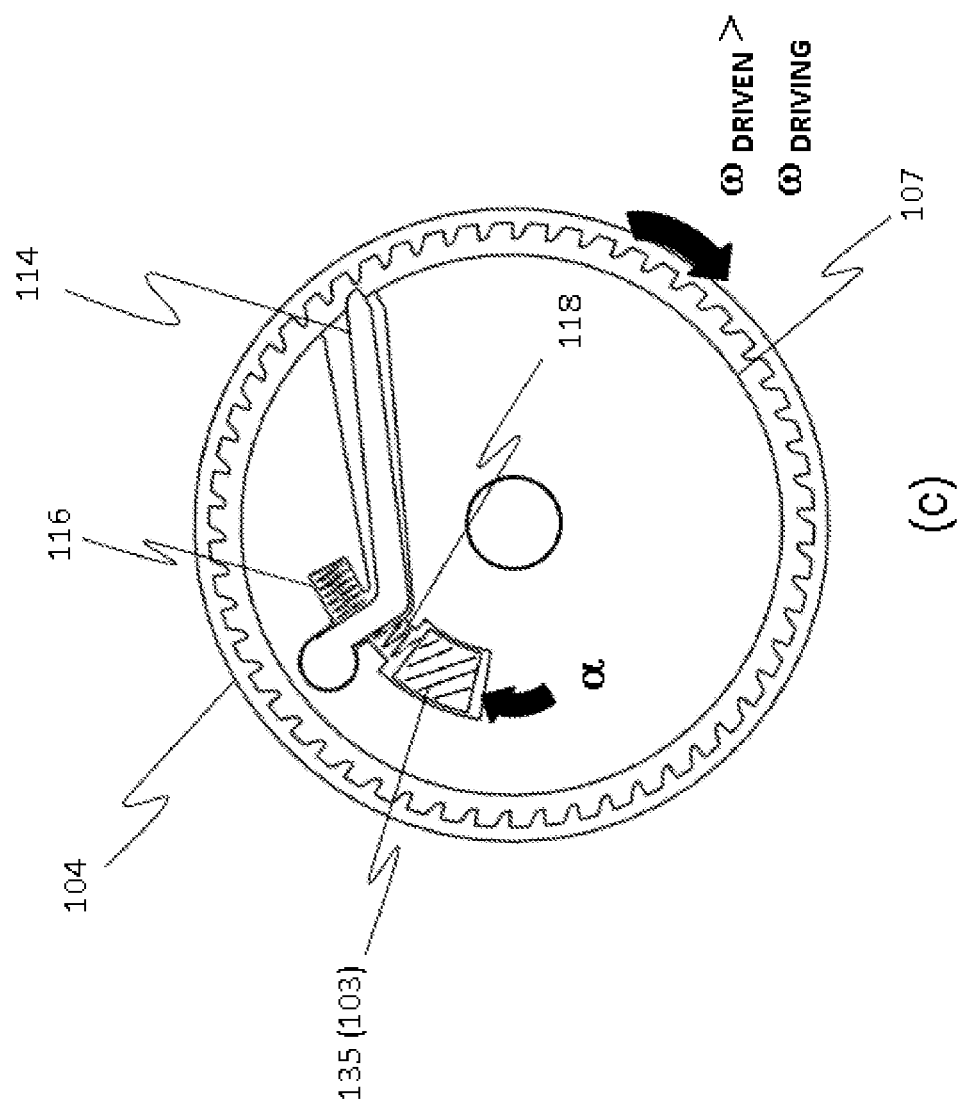

FIGS. 10A-10B represent a third scenario, which in FIG. 10A begins with the AFF in the free-coasting state, view (a), then shifting into the freewheeling state, view (b), and shifting back to the free-coasting state in FIG. 10B, view (c).

In view (a)—free-coasting—the driven member rotates forward and the driving member either remains stationary ($\omega=0$), rotates backward (if allowed), or rotates forward with a constant angular velocity ($\omega>0$).

View (b) shows the freewheeling state, with the driving member having at least the minimum angular acceleration ($\alpha_{DRIVING} \geq \alpha_{MIN}$). Note that the angular velocity of the driven member in this configuration is higher than that of the driving member ($\omega_{DRIVEN} > \omega_{DRIVING}$). Because of the relative movement of the driven member versus the driving member, engagement surfaces 106 pass "over" locking member 114 and a characteristic clicking sound of the freewheeling state is heard. Freewheeling biasing members 118 is compressed more in comparison to the engaged state whenever locking member 114 is not engaged in the engagement surfaces.

In view (c), free-coasting state, the driven member still has a higher angular velocity than the driving member ($\omega_{DRIVEN} > \omega_{DRIVING}$) and the driving member has a reduced angular acceleration ($\alpha$), meaning the driving member nonetheless experiences an increase in angular velocity, but the AFF remains in the free-coasting state.

Figure 11A:
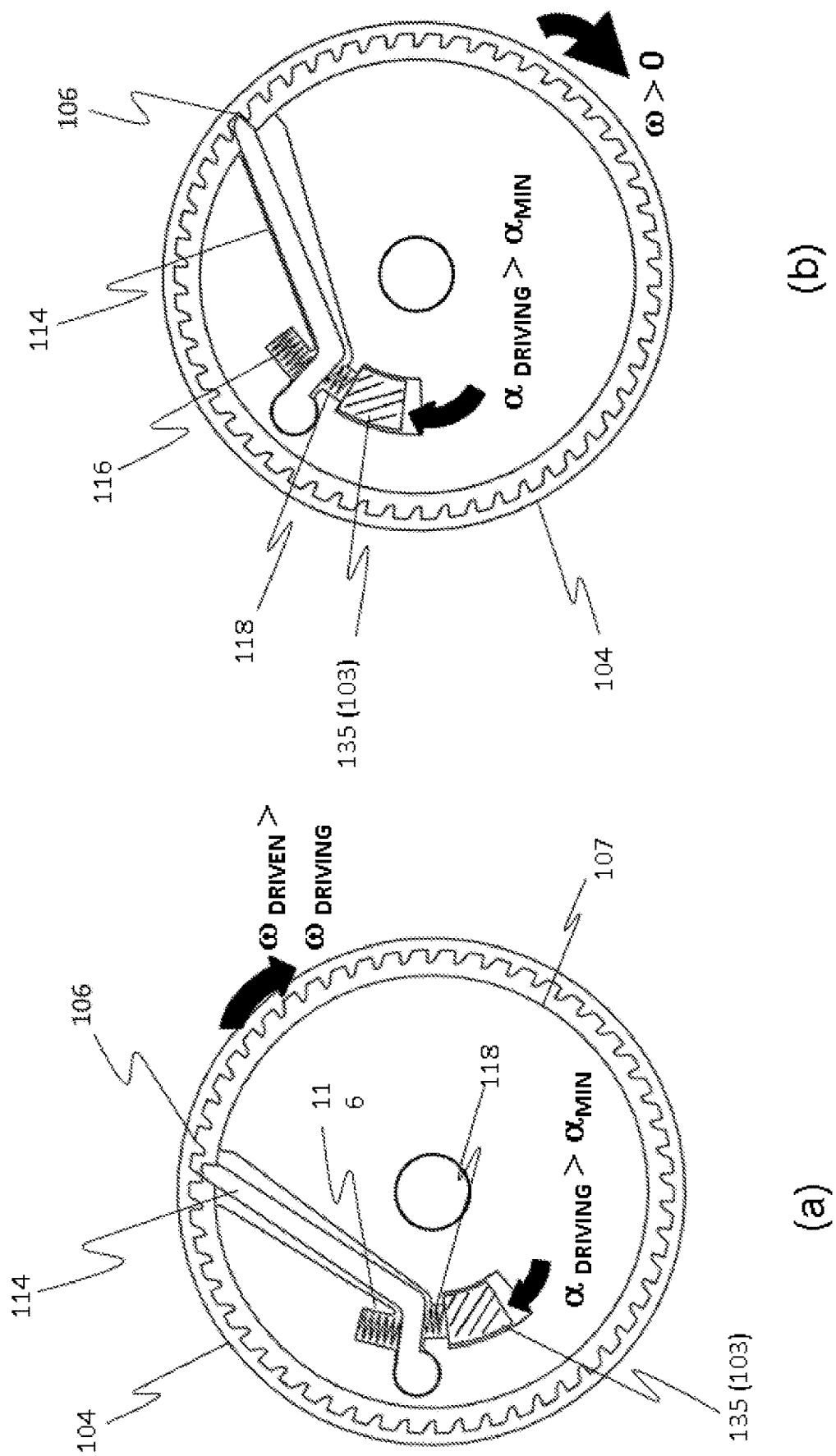

FIGS. 11A-11B represent a fourth scenario, which in FIG. 11A begins with the AFF in the freewheeling state, view (a), and shifting to the engaged state, view (b), and which in FIG. 11B begins in the engaged state, view (c) and shifting to the freewheeling state, view (d).

In view (a)—freewheeling—the driving member has at least the minimum angular acceleration ($\alpha_{DRIVING} \geq \alpha MIN$) and the driven member has a higher angular velocity than that of the driving member ($\omega_{DRIVEN} > \omega_{DRIVING}$).

In view (b) the AFF is in the engaged state with the driving member having $\alpha_{DRIVING} \geq \alpha_{MIN}$ and $\omega_{DRIVEN} = \omega_{DRIVING}$. This has come about, for example, by an increase in $\omega_{DRIVING}$ to match $\omega_{DRIVEN}$.

The AFF remains in the engaged state in view (c), as shown.

In view (d), the AFF is in the freewheeling state, with ($\alpha_{DRIVING} \geq \alpha_{MIN}$) and the driven member having a higher angular velocity than that of the driving member ($\omega_{DRIVEN} > \omega_{DRIVING}$). The increase in $\omega_{DRIVEN}$ is due to an external source, such as, but not limited to: gravity and wind, as noted hereinabove.

The four scenarios presented in FIGS. 8A-8B, 9A-9C, 10A-10B, and 11A-11B serve to illustrate various configurations of AFF 102 in the three states of operation. This information is summarized and presented in a logic flow diagram hereinbelow.

Reference is currently made to FIG. 12 is a logic flow diagram 200, identifying the three states of operation of the AFF and summarizing respective conditions for shifting between the three states, in accordance with embodiments of the current invention. The three states of operation, as identified hereinabove, are: a free coasting state 210; an engaged state 215; and a freewheeling state 220. In free coasting state 210, $\omega_{DRIVEN}$ and $\omega_{DRIVING}$ may have any values—which is a unique aspect of embodiments of the current invention. However, in step 230, once $\alpha_{DRIVING} \geq \alpha_{MIN}$, with $\alpha_{MIN}$ representing a threshold acceleration value, a shift from the free-coasting state takes place, depending on the relative velocities of the driven and driving member, as noted in step 232, $\omega_{DRIVEN} \leq \omega_{DRIVING}$. (In step 232, as well as similar logic/questions steps hereinbelow, a question mark "?" is to be understood to be included, thereby yielding a logical answer, "YES" or "NO".) If the answer is "YES" control is shifted to step 215, Engaged. If the answer is "NO", control is shifted to step 220, Freewheeling.

To attempt a shift from 215 Engaged to 220 Freewheeling, step 234 is evaluated. Both $\omega_{DRIVEN} > \omega_{DRIVING}$ and $\alpha_{DRIVING} \geq \alpha_{MIN}$ must be satisfied—yielding "YES" to shift to 220 Freewheeling. Otherwise, "NO"—do not shift.

In similar fashion, to attempt to shift from 220 Freewheeling to 215 Engaged, step 236 is evaluated, namely $\omega_{DRIVEN} \leq \omega_{DRIVING}$. If "YES" then to shift to 215 Engaged. Otherwise, "NO"—do not shift.

To attempt to shift from 215 Engaged to 210 Free-Coasting, step 238 is evaluated, namely $\alpha_{DRIVEN} \leq \alpha_{DRIVING}$ and $\omega_{DRIVING} < \omega_{DRIVEN}$. If "YES", then to shift to 210 Free-Coasting. If "NO"—do not shift.

Finally, to attempt to shift from 220 Freewheeling to 210 Free-Coasting, step 240 is evaluated, namely $\alpha_{DRIVING} < \alpha_{MIN}$ and $\omega_{DRIVING} < \omega_{DRIVEN}$. If "YES", then to shift to 210 Free-Coasting. If "NO", then do not shift.

The discussion hereabove identifies the freewheeling state and the fact that the condition $\alpha_{DRIVING} \geq \alpha_{MIN}$ must be satisfied to maintain the AFF in the freewheeling state. In practice, AFF 102 remains in the freewheeling state for only a small portion of time, compared to the time the AFF is in the engaged and free-coasting states. As a result, freewheeling friction that is common in all freewheels (ref FIG. 10A, view (b), for example) is negligible in AFF 102 and energy loss and concomitant wear of components are likewise minimal/negligible.

It is noted that AFF 102 is shown in FIGS. 5-11A, B and described hereinabove and has an exemplary radial configuration with one set locking member, recesses, etc. Additional configurations are included in embodiments of the current invention, such as, but not limited to two or more sets of locking members and recesses, and/or an axial configuration—mutatis mutandis—all as further discussed hereinbelow.

Specifically, logic flow diagram 200 identifies the three states of operation for both radial and axial AFF configurations in embodiments of the current invention, and the logic flow diagram serving to summarize respective conditions for shifting between the three aforementioned states—as additionally described hereinbelow. Whereas shifting and operation of AFF configurations, according to logic diagram 200, is dependent upon changing accelerations and velocities as described hereinabove, the term "automatic", in reference the AFF and its operation, is intended to mean in the entire specification and in the claims which follow that the shifting from engage state/freewheeling state back into free-coasting state is made by the mechanism itself without any need from the user to manually shift. One example of such "manual shift" in the case of a bicycle can be if the user need to pedal backwards in order to shift into free-coasting state.

AFF 102 performance can be changed by a number of design/structural changes to the inertial unit to affect $\alpha_{MIN}$ (minimal angular acceleration)—a key parameter related to shifting from and to the three states of the AFF—or to changing the AOE—related to AFF reaction/shifting speed.

The following exemplary possibilities, among additional possibilities, include:

1. Increasing/decreasing the moment of inertia (I) of the inertial unit (by changing its mass and/or geometry). A higher I value yields a lower $\alpha_{MIN}$ and a lower I value yields a higher $\alpha_{MIN}$. Changing I of the inertial unit may be accomplished by changing the mass of the inertial unit and/or affecting geometric changes (including, for example, a thicker or thinner suspension member). Optionally or alternatively, an increase of the mass, thereby increasing I, may be accomplished by mechanically fixing the suspension member to its own axle segment (thereby adding the mass of the axle segment to the mass of the inertial unit). The inertial unit axle segment would then be allowed to rotate relative to the axle (ref previous figures) using mechanical or magnetic bearings, as known in the art.

2. Increasing/decreasing the spring force (resistance) of the non-engagement biasing member. This can be done by increasing/decreasing the exemplary "k" value (spring constant, as known in the art) and/or by pre-loading the non-engagement biasing member. A higher spring biasing force yields a higher $\alpha_{MIN}$ whereas a lower spring force yields a lower $\alpha_{MIN}$. It is noted that the description hereinabove is not limited to only a spring biasing member, but to other biasing members, as known in the art.

3. In a radial design of AFF 102, increasing/decreasing the geometry/structure of locking member 114 affects $\alpha_{MIN}$ and AOE. Reference is currently made to FIG. 13A, which is an enlarged view of the AFF, as shown in the sectional view FIG. 7, including dimensions D1, D2, D3, D4 and R1, in accordance with embodiments of the current invention. Apart from differences described below, driving member 103, inertial unit 107, and biasing extension tooth 135 of FIG. 7 (hereinabove) are identical in notation, configuration, and functionality to that shown in FIG. 13A. including:

i. Changing dimension D1, which is the distance from the position non-engagement biasing member 116 presses on the locking member from rotational axis 114a of locking member 114 (ref FIGS. 6A and 7 view (b)), where a longer dimension yields higher $\alpha_{MIN}$ and a shorter dimension yields lower $\alpha_{MIN}$; and ii. Changing dimension D2, which is the distance from the position freewheeling biasing member 118 presses on the locking member from rotational axis 114a of locking member 114 (ref FIGS. 6A and 7 view (b)) where a longer dimension yields lower $\alpha_{MIN}$ and a shorter dimension yields a higher $\alpha$MIN.

Additionally or optionally, the ratio ("$R_{D2D1}$") of dimensions D1 and D2, expressed as ratio=D2/D1 may be changed, whereby a larger value of $R_{D2D1}$ infers a lower $\alpha_{MIN}$ and a smaller value of $R_{D2D1}$ infers a larger $\alpha_{MIN}$.

iii. Changing dimension D3 which is the length of locking member 114 from rotational axis 114a (ref FIGS. 6A and 7 view (b)) to the end of the locking member at second end 124b (ref FIG. 6A) affects AOE, with a longer value of D3 serving to decrease AOE (quicker reaction/quicker shifting) and a shorter value of D3 serving to increase AOE (slower reaction/slower shifting) as described further hereinbelow. Dimension D4 is the clearance distance between the second end 124b of the locking member 114 and the groove in engagement surface 106 (as shown in FIG. 13A).

iv. The ratio D3/D2 presents a "lever effect" where a higher ratio value serves to move the second end 124b of the locking member the distance D4 with less rotation thereby effectively shorten AOE.

v. Changing dimension R1 which is the distance from the axis 105 to the position freewheeling biasing member 118 presses on the locking member (including changing radial position of biasing extension tooth 135 from axis 105 and the corresponding radial position of biasing extension tooth recess-passage 130 (ref FIGS. 6A and 7 view (b)) affect the AOE, with a longer value of R1 serving to decrease AOE. This result is due to the known fact that a higher R1 means biasing extension tooth 135 travels a "longer arc" for the same angle of rotation. This "longer arc" of travel is translated into closing distance D4 with less rotation thereby effectively shorten AOE.

Minimal angular acceleration ($\alpha_{MIN}$) is specifically affected by design/structural changes to the inertial unit, as described hereinabove. In general, any change to the inertia unit which serves to impact/change lag/inertial characteristics of the inertial unit may serve to change $\alpha_{MIN}$. Two examples, as described hereinbelow, relate to configuring additional mechanical components to change lag/inertial characteristic of the inertial unit.

Reference is currently made to FIG. 13B, which is an exploded view of driven member 104, axis 105, and inertial unit 107 of the AFF shown in FIG. 5 and the AFF shown in the sectional view of FIG. 7, including a magnetic lag assembly 145, in accordance with embodiments of the current invention. Apart from differences described below, driving member 103, inertial unit 107, and biasing extension tooth 135 of FIGS. 5 and 7 (hereinabove) are identical in notation, configuration, and functionality to that shown in FIG. 13B. In AFF configurations having limited space or weight restrictions, the inertial unit may not have sufficient I (moment of inertia) to effectively control shifting (i.e., introduce a lag in ω to allow the locking member to engage) and the $\alpha_{MIN}$ value may be too high.

Magnetic lag assembly 145 is an exemplary, non-limiting embodiment of the current invention where an additional mechanical component is configured to affect $\alpha_{MIN}$. Magnetic lag assembly 145 includes: an axle-mounted magnetic ring assembly 148 and an inertial unit-mounted magnetic ring assembly 150, both assemblies configured coaxially with axle 105a and having no contact with one another. In the current figure, axle-mounted magnetic ring assembly 148 is shown configured concentrically, within with the inertial unit-mounted magnetic ring; however, the two rings may optionally be mounted oppositely, with inertial unit-mounted ring 150 configured concentrically within axle-mounted magnetic ring assembly 148, as evident from the discussion which follows hereinbelow.

Referring to view (a) of the current figure, axle-mounted magnetic ring assembly 148 includes: a ring 151, which is mechanically fixed onto axle 105a; and a plurality of magnetic elements 152 mechanically fixed onto ring 151.

Inertial unit-mounted ring 150 includes a plurality of magnets 153 mechanically fixed into suspension member 110 of inertial unit 107, as shown in the figure. Magnets of both axle-mounted magnetic ring assembly 148 and inertial unit-mounted ring 150 are aligned so that respective polarities of the respective rings attract each other. View (b) of the current figure shows the axle-mounted ring assembly and the inertial unit-mounted ring with their magnets aligned, typical of when the axle and the inertial unit have ω=0 and locking member 114 is not engaged.

In view (b) respective rings (and their respective magnets) serve to "delay" relative movement of inertial unit to the axle, even when driving member 103 is rotated forward and a is subsequently applied to biasing extension tooth 135. View (c) shows an instantaneous configuration of the AFF as biasing extension tooth 135 is advanced, serving to engage locking member 114 (as shown schematically by the arrow in the figure), yielding a shift to the engaged state. Immediately following the configuration shown in view (c), the respective magnetic rings are no longer aligned—as there is relative movement between them—with the inertial unit and axle have different W values, indicated schematically in the figure as ω>0.

As the inertial unit rotates relative to axle-mounted magnetic ring assembly 148, the magnetic force between the two respective rings is minimized, as respective magnets are alternately not aligned over time (not shown in the current figure).

Reference is currently made to FIG. 13C, which is an exploded view of driven member 104, axis 105, and inertial unit 107 of the AFF shown in FIG. 5 and the AFF shown in the sectional view of FIG. 7, including a clamping member assembly 155, in accordance with embodiments of the current invention. Apart from differences described below, driving member 103, inertial unit 107, and biasing extension tooth 135 of FIGS. 5 and 7 (hereinabove) are identical in notation, configuration, and functionality to that shown in FIG. 13C and in previous figures.

As noted hereinabove (ref FIG. 13B) an AFF configuration may have limited space or weight restrictions, and the inertial unit may not have sufficient I (moment of inertia) to effectively control shifting (i.e., introduce a lag in D to allow the locking member to engage) and the $\alpha_{MIN}$ value may be too high. Clamping member 155 assembly is an additional, exemplary, non-limiting embodiment of the current invention where an additional mechanical assembly is configured to affect $\alpha_{MIN}$. Clamping member assembly 155 (ref views (a) and (b)) includes: a clamping member 156 having an incomplete/open circular shape with an opening "OP" dimension as shown in view (b), the clamping member having a first side 156a and a second side 156b which has at least one clamping member protrusion 158 mechanically fixed into suspension member 110 of inertial unit 107, using dedicated slots 159 inserted into the suspension member, and positioned coaxially with axis 105a, as shown in view (a). The shape of clamping member 156 gives it a radial spring effect, and—as shown in view (c)—clamping member 156 typically presses/clamps upon axle 105, thereby inhibiting rotation of suspension member 110 of the inertial unit.

In the configuration the current embodiment, a protruding post 165 is mechanically fixed upon and protruding from the driving member, similar to the configuration of biasing extension tooth 135 (ref FIG. 6b, view (b) but with protruding post 165 having a position upon the driving member and a having a protrusion and a cross-sectional shape to allow the protruding post to fit into opening OP, as shown in views (c) and (d) without the protruding post contacting the suspension member. In this way, when the driving member is advanced, the biasing extension tooth and protruding post 165 are advanced, with the protruding post serving to open clamping member 156 (by increasing opening OP) after the locking member is engaged, as further described below.

Further referring to view (c), clamping member 156 clamps upon axle 105a, as shown by space "S"=0 indicated in the figure. In this configuration, ω=0 for inertial unit 107—the inertial unit is stationary and locking member 114 is not engaged. Referring to view (d): the driving member experiences a (also experienced by biasing extension tooth 135 and protruding post 165) which serves to advance and lock locking member 114 (into the engaged state). The clamping member is then extended/urged open by protruding post 165, as indicated by the small arrow in view (d), causing clamping member 156 to open (opening OP to have a larger dimension that shown in view (c)) and to create a positive space (S>0)—as shown in the figure—thereby unclamping and enabling inertial unit 107 to rotate (ω>0). It is important to note that opening the clamping member is achieved not only by advancing the protruding post 165 against one side (156a) of the clamping member (as shown), but also because the other side of the clamping member 156b (with the clamping member protrusion 158) is lagged. This lagging takes place since the driven member 104 is locked/engaged with the inertia unit 107 (the locking member is engaged) and the characteristic of driven member 104 (and any driven member) is to typically have drag (from an external source), rolling resistance and its own moment of inertia, which all serves to effectively lag one side of the clamping member (156b) while the other side (156a) advance. In this manner, as the driving member, the driven member, the inertia unit and the clamping member rotate forward together in the engaged state, the clamping member is maintained opened and no friction/wear with the axle occurs When the AFF returns to the free-coasting state (with the protruding member also no longer serving to urge open the clamping member) clamping member 156 and opening OP return to their respective original shapes, due to a spring force of the clamping member. S likewise returns to the zero value, and inertial unit 107 is clamped to the axle (similar to the configuration shown in view (c)).

Embodiments of the current invention include clamping member assembly 155 taking alternate forms and/or alternate configurations to affect the clamping/unclamping effect described hereinabove.

Reference is currently made to FIGS. 14A and 14B, which are sectional views of a race configuration AFF 202 (which is similar to AFF 102 shown in FIG. 7) including a detailed view "B" thereof, in accordance with embodiments of the current invention. Apart from differences described below, driving member 103, driven member 104, inertial unit 107, and at least one biasing extension tooth 135 of FIG. 7 (hereinabove) are identical in notation, configuration, and functionality to that shown in FIG. 14.

Additionally, as shown in detail B (view "b") AFF 202 has three exemplary sets of suspension member recesses 212

(similar to suspension member recesses 112 shown in FIGS. 5 and 6A, hereinabove), respectively, including:
- a locking member recess 224, in which a locking member 214 is positioned, the locking member being displaced to engage and disengage the engagement surface;
- a biasing member recess-passage 226, in which a non-engagement biasing member 216 is positioned; and
- a biasing extension tooth recess-passage 230, in which biasing extension tooth 135 (130) and a freewheeling biasing member 218 are positioned, the freewheeling biasing member is in contact with the locking member, as shown in view "b".

AFF 202 additional includes a plurality of: recesses; biasing members; biasing extension teeth; and locking members—as described hereinabove. All of the embodiments described hereinabove (ref FIGS. 8A, 8B, 9A-C, 10A, 10B, 11A, 11B, 13A-C) may likewise include one or more sets, respectively, of biasing extension teeth, locking members, and associated biasing members.

In race configuration AFF 202, as opposed to a ratchet configuration of FIG. 7 and as described hereinabove, an engagement surface 106a (also called "race") is similar to engagement surface 106 of FIG. 7, but engagement surface 106a is a continuous and a non-ratcheted/non-toothed surface on driven member 107, as shown in the current figure. The locking member engages engagement surface 106a, as previously described hereinabove, related to a race configuration. FIGS. 14A and 14B specifically show AFF 202 in the engaged state.

AFF 202 is configured so that when the locking member engages the engagement surface (i.e. "engaged state") biasing extension teeth 135 (103) are still able to advance inside biasing extension tooth recess-passage 230 to further deform (elastically) the respective freewheeling biasing members 218 against the respective locking members, thereby providing additional force to enhance traction between the locking member and the race/engagement surface.

One way to increase traction of the locking member with the race as known in the art, is to use biasing members (i.e. exemplary springs) having a higher spring constant to provide greater force of the locking member upon the race. However, in AFF 202 (as opposed to conventional race freewheels, such as sprag clutches), increasing the force of the biasing member as described above, does not concomitantly increase drag, friction, and wear in the freewheel, as the time in the freewheeling state is very short, as described hereinabove.

Reference is currently made to FIGS. 15A and 15B, which are, respectively assembled and exploded isometric views of an AFF 302, having an axial configuration, and a detailed view of part of AFF 302, in accordance with embodiments of the current invention. AFF 302 includes: a driving member 303 having at least one biasing extension tooth 335; a driven member 304; a common axis of rotation 305, defining an exemplary axle 305a; engagement surfaces 306 of the driven member, and an inertial unit 307. As indicated hereinabove, axle 305a is typically mechanically fixed to the vehicle/bicycle (not shown in the figure), whereas driving member 303, driven member 304, and inertial unit 307 are free to move in a radial direction, meaning a direction of rotation about axis 305, and they are typically mounted onto axle 305a using bearings, as known in the art (not shown in the current figure for simplicity).

When assembled, AFF 302 is operated similarly to that described for AFF 202 and AFF 102 hereinabove, which includes interactions of the driving member, driven member, and inertial unit, and shifting between/among free-coasting, engaged, and freewheeling states, subject to the relationship of $a_{DRIVING}$ and $a_{MIN}$, as described hereinabove, ref FIG. 12, and as further described hereinbelow. Similar to the inertial units of AFF 202 and 102, inertial unit 307 includes: a suspension member 310 having at least one biasing extension tooth recess-passage 330; a locking member 314; a free-coasting biasing member 316 (also referred to hereinbelow as a "non-engagement biasing member"): and a freewheeling biasing member 318—all configured in a radial design and as shown in the current figure.

As noted hereinabove, driving member 303, driven member 304, inertial unit 307, suspension member 310, locking member 314, free-coasting biasing member 316 and freewheeling biasing member 318 are all free to move in the radial direction—with free-coasting biasing member 316 rotating in unison with suspension member 310, as further described hereinbelow. Driving member 303 and driven member 304 are fixed in an axial direction with an axial displacement "F" (ref view (a)) maintained between the driving and driven member in all operational states (drive, freewheeling, and free-coasting) of AFF 302. Additionally, suspension member 310, is constrained along axis 305a, meaning that while the suspension member freely rotates about axis 305a (in the radial direction) it is stationary/constrained in the axial direction. Locking member 314, may move in both radial and axial directions, as further described hereinbelow.

Summarizing the points above: movement of driving member 303 and driven member 304 is constrained in the axial direction and the driving and driven members are maintained along axis 305a at a fixed axial distance F from one another, with axial and radial movement of the other "sandwiched" elements (including locking member 314, free-coasting biasing member 316 and freewheeling biasing member 318) between the driving and driven members allowed. However, suspension unit 310, configured between the driving and driven members as shown in the current figure, is fixed in the axial direction. Elements which are constrained in the axial direction may be mechanically fixed with: glue/adhesive; washers: spacers: lock nuts; Allen screws; and/or similar mechanical fasteners, as known in the art.

Locking member 314 may translate axially in relation to the axially-fixed suspension member, with free coasting biasing member 316 serving to alternately bias the locking member axially away from the suspension member (when the free-coasting biasing member is extended) and to bias the locking member axially towards the suspension member (when the free-coasting biasing member is compressed). Axial translation of the locking member alternately engages and disengages the locking member with engagement surface 306 of the driven member 304.

As shown in FIGS. 15A and 15B (Detail "C") locking member 314 and suspension member 310 are shaped to allow relative axial movement between each other by peripheral "ribs and slots" structures (as shown in FIG. 15A (b)), with free-coasting biasing member 316 and the suspension member being positioned concentrically to the locking member. Additionally, freewheeling biasing member 318 is formed to allow it to selectively engage with both the locking member and the driving member. Freewheeling biasing member 318 has at least one deflected extension 318a and at least one "V" shaped extension 318b along the periphery of the freewheeling biasing member. The at least one deflected extension (318a) allows the freewheeling biasing member to mate with at least one translating mating surface 303a on the driving member, and the at least one "V"

shaped extension (318b) allows the freewheeling biasing member to mate with locking member 314—all as shown in the views "b" and "a" of FIG. 15A. The respective configurations and structures of both freewheeling biasing member 318 and of free-coasting biasing member 316 to bias the locking member, as described hereinbelow.

It is noted that whereas freewheeling biasing member 318 and associated mating parts (including: driving member 303 and locking member 314) are shown in FIGS. 15A and B with configurations suited to six deflected extensions (318a) and six "V" shaped extensions (318b), embodiments of the current invention may include at least one of each of the respective extensions.

Reference is currently made to FIG. 16, which shows three views (a, b, and c) of AFF 302 of FIGS. 15A and 15B, in respective free-coasting, engaged, and freewheeling states, in accordance with embodiments of the current invention. As noted previously, AFF 302 is operated similarly to that described for AFF 202 and AFF 102 hereinabove, including interactions of the driving member, driven member, and inertial unit, and respective conditions for shifting between/among free-coasting, engaged, and freewheeling states, dependent on the relationship of $\alpha_{DRIVING}$ and $\alpha_{MIN}$, according to the logic flow diagram of FIG. 12. A summary of the three states is presented hereinbelow.

In view "a", starting with the free-coasting state, angular velocities of both the driving and driven members may take on any values,) as they may rotate independently of each other. Additionally, it can be seen in view "a" that locking member 314 has not translated axially and is nor contacting driven member 304. Spring extension elements 318a are shown to be displaced, as the driving member displaces the extension elements. To initiate a shift into the engaged state, angular acceleration $\alpha_{DRIVING}$, is applied to the driving member, as shown in the view "b".

In view "b", the engaged state, the angular acceleration applied (and maintained) on the driving member $a_{DRIVING}$ exceeds or is equal to $a_{MIN}$ (indicated as $a_{DRIVING} \geq a_{MIN}$ in the figure). Locking member 314 has translated axially—as described below—and is presently engaged with driven member 304. By definition, in the engaged state, $\omega_{DRIVING} = \omega_{DRIVEN}$, and spring extension elements 318a are not displaced, as freewheeling biasing member 318 has advanced with the locking member axially along the suspension member, which has displaced/translated the locking member to an engaged state.

View "c" shows the freewheeling state, with locking member 314 biasing axially away from the driven member (and towards the driving member) and is disengaged with driven member 304. Spring extension elements 318a are not displaced and freewheeling biasing member 318 is biasing against translating mating surface 303a.

Shifting from engaged\freewheeling states back to free-coasting state takes place as the locking member 314 unlocks with the engagement surface 306 (under the same conditions shown in the flow diagram FIG. 12) and the free-coasting biasing member then retrieve the locking member toward the suspension member and away from the driven member.

The principles of operating AFF 302 are shared with embodiments of the current invention, as shown and described hereinbelow.

Reference is currently made to FIG. 17, which shows, respectively assembled and exploded partial isometric views of an AFF 402, which is an alternate configuration of AFF 302 of FIGS. 15A and 15B, in accordance with embodiments of the current invention. Apart from differences described below, driving member 403, inertial unit 407 are identical in configuration and functionality to AFF 302 and the driving member and inertial unit shown in FIGS. 15A and B. Comparing AFF 402 with AFF 302, it may be seen that driving member 403, freewheeling biasing member 418, and locking member 414—while respectively having differing shapes than the corresponding respective parts in AFF 302—are formed to mate with one another and function in AFF 402 similarly to the functionality of the respective corresponding parts in AFF 302.

Attention is drawn, for example, to a freewheeling biasing member 418, which is formed having extensions 418a in reversed direction to extensions 318a, shown in freewheeling biasing member 318 of AFF 302. Similar to the configuration of AFF 302, locking member 414 and suspension member 410 of AFF 402 are shaped to allow relative movement between each other, with free-coasting biasing member 416 and the suspension member being positioned concentrically to the locking member. Additionally, freewheeling biasing member 418 is formed to allow it to selectively engage with both the locking member and the driving member. Freewheeling biasing member 418 has at least one deflected extension 418a and at least one recessed indentation 418b along the periphery of the freewheeling biasing member. The at least one deflected extension (418a) allows the freewheeling biasing member to mate with at least one translating mating surface 403a of the locking member 414, and at least one recessed indentation 418b allows the freewheeling biasing member to mate with the at least one biasing extension tooth 435 of the driving member, —all as shown in the views "b" and "a" of FIG. 17.

It is noted that whereas freewheeling biasing member 418 and associated mating parts (including: driving member 403 and locking member 414) are shown in FIG. 17 having configurations of six deflected extensions (418a) and three recessed indentation (418b), embodiments of the current invention may include at least one of each of the respective extensions.

Reference is currently made to FIG. 18, which shows three views including: an isometric view of a rotating hub 525 (view "a"), an isometric, partially sectional view of an AFF 502 (view "b"); and an exploded isometric view of some parts of AFF 502 (view "c"), in accordance with embodiments of the current invention. Apart from differences described below, common axis of rotation 305 and axle 305a are identical in configuration and functionality to axis 305 and axle 305a shown in FIGS. 15A, B, 16, and 17.

AFF 502 includes: a driving member 503; a driven member 504; engagement surfaces 506 of the driven member, and an inertial unit 507. Similar to the configuration of similar parts in AFF 302 (FIG. 15A), while axle 305a is typically mechanically fixed to the vehicle/bicycle (not shown in the figure), driving member 503, driven member 504, and inertial unit 507 are free to move in a radial direction, meaning a direction of rotation about axis 305, and they are typically mounted onto axle 305a using bearings, as known in the art (not shown in the current figure for simplicity).

AFF 502 is operated similarly to that described for AFF 302 hereinabove, which includes interactions of the driving member, driven member, and inertial unit, and shifting between/among free-coasting, engaged, and freewheeling states, subject to the relationship of $a_{DRIVING}$ and $a_{MIN}$, as described hereinabove, ref FIG. 12. Similar to the configuration of inertial units of AFF 302, inertial unit 507 includes: a suspension member 510: a locking member 514 and a free-coasting biasing member 516 and a freewheeling biasing member 518—all configured in a radial design, similar to that of AFF 302 and as shown in the current figure. Additionally, a rotating hub 525 is included in AFF, with the rotating hub operating in concert with driven member 504, and further described hereinbelow.

As noted hereinabove, related to all configurations of the driven member, in all embodiments described in the specification and claims which follow, a connection of the driven member with additional elements external to the AFF is to be understood/assumed, even though no such integral connections are described and/or shown hereinbelow. Similarly, in AFF 502, rotating hub 525 (driven by the driven member) in turn serves to drive additional elements external to AFF 502.

Similar to AFF 302 as noted hereinabove, in AFF 502, driving member 503, driven member 504, inertial unit 507, suspension member 510, locking member 514, free-coasting biasing member 516 and freewheeling biasing member 518 are all free to move in the radial direction—with free-coasting biasing member 516 rotating in unison with suspension member 510, as further described hereinbelow. Additionally, rotating hub 525 is free to move in a radial direction. Driving member 503 and rotating hub 525 are fixed in an axial direction and axial dimension "G" (ref view (b)) is maintained in all operational states (drive, freewheeling, and free-coasting) of AFF 502. Additionally, suspension member 510, is constrained along axis 305a, meaning that while the suspension member freely rotates about axis 305a (in the radial direction) it is stationary/constrained in the axial direction. Locking member 514 and driven member 504 may move in both radial and axial directions, as further described hereinbelow.

Summarizing the points above: movement of driving member 503 and rotating hub 525 is constrained in the axial direction and the driving member and rotating hub are maintained along axis 305a at a fixed axial distance G from one another, with axial and radial movement allowed for the other "sandwiched" elements (including locking member 514, driven member 504 free-coasting biasing member 516, and freewheeling biasing member 518) between the driving member and the rotating hub. However, suspension member 510, configured between the driving and driven members, as shown in the current figure, is additionally fixed in the axial direction. Elements which are constrained in the axial direction may be mechanically fixed with: glue/adhesive; washers, spacers, lock nuts; Allen screws; and/or similar mechanical fasteners, as known in the art.

Driven member 504 is formed with at least one longitudinally-aligned rib 504a along its outer surface, the at least one rib configured to slidingly mate with at least one longitudinally-aligned slot 525a in an inner surface of the rotating hub, thereby enabling driven member 504 to be configured concentrically to and to drive rotating hub 525, as shown in the figure, freewheeling biasing member 518 is positioned concentrically within rotating hub 525 and serves to bias driven member 504 axially towards and away from inertial unit 507 during freewheeling state, while the driven member is maintained within the rotating hub, as shown in FIG. 18(b).

Locking member 514, suspension member 510, and driving member 503 are shown in view "c", but without free-coasting biasing member 516—which is configured concentrically within both the locking and the suspension members (as shown in view "b"). Free-coasting biasing member 516 serves to alternately bias the locking member to and from the suspension member, the suspension member being fixed in the axial direction. Locking member 514 has at least one locking slot 514a formed a to receive at least one suspension protrusion 510a and locking member additionally has at least one locking member protrusion 536, having a slanted termination, which is formed to mate with the translated mating surface 503a—as shown in both views "c" and "b".

It is seen in view "b" that as the driving member rotates, and depending on its acceleration versus the threshold acceleration $\alpha_{MIN}$ and the interaction with inertial unit 507, the locking member is translated towards and away from the driving member (and, likewise away and toward the driven member) due to the interaction of at least one locking member protrusion 536 with at least one translated mating surface 503a (which has a matching slanted surface).

It is noted that whereas in FIG. 18, three suspension protrusion 510a, three biasing extension tooth recess-passages 530, three locking member slots 514a, three biasing extension teeth 535, and three locking member protrusion 536 are shown, embodiments of the current invention may include at least one or more of the respective elements named above. Alternatively, or optionally, the respective slanted surfaces of at least one locking member protrusion 536 and of at least one translated mating surface 503a may be reversed in AFF 502, mutatis mutandis.

Reference is currently made to FIG. 19, which shows an assembled and exploded isometric view of an inertial unit 607 (views "a" and "b") and an isometric, partially sectional view of an AFF 602 (view "c"), in accordance with embodiments of the current invention. Apart from differences described below common axis of rotation 305 and axle 305a are identical in configuration and functionality to axis 305 and axle 305a shown in FIGS. 15A, B, 16, 17, and 18. Furthermore, AFF 602 is configured and operated similarly to that described for AFF 502 (ref FIG. 18), hereinabove, apart for differences described below.

Similar to AFF 502, AFF 602 includes movement of a driving member 603 and a rotating hub 625 being constrained in the axial direction and the driving member and rotating hub are maintained along axis 305a at a fixed axial distance from one another, with axial and radial movement allowed for the other "sandwiched" elements (including a locking member 614 and free-coasting biasing member 616) between the driving member and the rotating hub, with exception of the driven member 604 being fixed to the rotating hub (for example by threading as shown) and the freewheeling biasing member 618 being axially constrained (for example by being glued to the driving member). However, in the current configuration while suspension member 610, configured between the driving and driven members, as shown in the current figure, is additionally fixed in the axial direction, locking member 614 translates axially to engage and disengage driven member 604 from an alternate side than that shown in previous AFF configurations. Elements which are constrained in the axial direction may be mechanically fixed with: glue/adhesive; washers, spacers, lock nuts; Allen screws; and/or similar mechanical fasteners, as known in the art.

As seen in views "a" and "b", inertial unit 607 includes: locking member 614; free-coasting biasing member 616 and suspension member 610. Functioning of inertial unit 607 is similar to previously described AFF configurations and follows the same shifting operation logic flow diagram of FIG. 12 as further described hereinbelow. At least one locking member slanted-edged protrusion 636 and at least one freewheeling biasing member deflected extension 633 serve to interact with driving member 603 to affect operation as described hereinbelow.

Driven member 604 is mechanically fixed in relation to rotating hub 625 in both radial and axial movement—meaning that the two rotate together (radially) with no axial translation. Threading 635 is shown in the figure as one way to mechanically fix the driven member with the rotating hub (by tightening the driven member against the end of threading 635) but alternate methods of mechanically fixing the two are possible, such as but not limited to: glue/adhesive; lock nuts; Allen screws; and/or similar mechanical fasteners, as known in the art.

Reference is currently made to FIG. 20, which shows three views (a, b, and c) of AFF 602 of FIG. 19, in respective free-coasting, engaged, and freewheeling states, in accordance with embodiments of the current invention. As noted previously, AFF 602 is operated similarly to that described for AFF 502, 402, 302, 202, and 102 hereinabove, including interactions of the driving member, driven member, and inertial unit, and respective conditions for shifting between/among free-coasting, engaged, and freewheeling states, dependent on the relationship of $\alpha_{DRIVING}$ and $\alpha_{MIN}$, according to the logic flow diagram of FIG. 12. A summary of the three states of AFF 602 is presented hereinbelow.

In view "a", starting with the free-coasting state, angular velocities of both the driving and driven members may take on any values, as they may rotate independently of each other. Additionally, it can be seen in view "a" that locking member 614 has not translated axially and is not contacting driven member 604. To initiate a shift into the engaged state, angular acceleration $\alpha_{DRIVING}$ is applied to the driving member, as shown in the view "b".

In view "b", the engaged state, the angular acceleration applied (and maintained) on the driving member $a_{DRIVING}$ exceeds or is equal to $a_{MIN}$ (indicated as $a_{DRIVING} \geq a_{MIN}$ in the figure). Locking member 614 has translated axially—as described below—and is presently engaged with driven member 604. By definition, in the engaged state, $\omega_{DRIVING} = \omega_{DRIVEN}$ and extension elements 633 are not displaced, as the locking member has compressed free-coasting biasing member 616 and advanced axially along the suspension member, which has displaced/translated the locking member to an engaged state.

View "c" shows the freewheeling state, with locking member 614 biasing axially away from the driven member (and away from the driving member) and is disengaged with driven member 604. Extension elements 633 are not displaced and freewheeling biasing member 618 is biasing against the slanted-edged protrusion 636.

Embodiments of all AFF radial and to axial AFF configurations 302, 402, 502, and 602 described hereinabove not only function according to logic flow diagram 200 of FIG. 12, as described hereinabove, but $\alpha_{MIN}$ is adjustable by changes to the lag/inertial characteristics of the inertial unit as described hereinabove and/or by introduction of the clamping member assembly and/or the magnetic lag assembly shown and described hereinabove in FIGS. 13B and 13C, respectively, mutatis mutandis.

It is appreciated that the above descriptions are intended only to serve as examples, and that many other embodiments are possible within the scope of the present invention as defined in the appended claims.

The invention claimed is:

1. An automatic free-coasting freewheel (AFF) having: a free-coasting state; an engaged state and a freewheeling state, the AFF comprising:
   a driving member;
   an inertial unit having lag/inertial characteristics;
   a driven member having at least one engagement surface;
   a freewheeling biasing member; and
   an axis of rotation defining an axle, the axis having an axial and a rotation direction;
   wherein the driving member, driven member and inertial unit are respectively coaxially mounted onto the axle and are rotatable thereupon, the driving member configured to controllably rotate relative to the inertia unit in the rotation direction, depending upon the free coasting, engaged, and freewheeling states;
   the driving and driven members respectively having respective angular velocities: $\omega_{DRIVING}$ and $\omega_{DRIVEN}$; and respective angular accelerations $\alpha_{DRIVING}$ and $\alpha_{DRIVEN}$;
   wherein the inertial unit is positioned between the driving member and the driven member, the inertial unit further comprising a suspension member configured with at least one set of:
      i. a locking member having a locking member shape and configuration, the locking member configured to engage and disengage the at least one engagement surface; and
      ii. a free-coasting biasing member configured to act on the locking member to shift it away from the at least one engagement surface;
   wherein the inertial unit is configured to interact between the driving and the driven member to controllably maintain and to automatically shift between the free-coasting, engaged, and freewheeling states, depending upon $\alpha_{DRIVING}$ versus a threshold driving member angular acceleration value ($\alpha_{MIN}$) and $\omega_{DRIVEN}$ and $\omega_{DRIVING}$; and
   wherein $\alpha_{MIN}$ is adjustable by changes to the lag/inertial characteristics and configuration of the inertial unit; and
   wherein the freewheeling biasing member is configured to bias the locking member and the engagement surface away from each other in the freewheeling state.

2. The AFF according to claim 1, wherein configuration of additional mechanical components includes at least one chosen from the list including: a clamping member assembly and a magnetic lag assembly.

3. The AFF according to claim 1, having a radial configuration, wherein the suspension member includes at least one set of suspension recesses formed therein, each set including:
   a locking member recess, in which the locking member is displaceable and configured to engage and disengage the at least one engagement surface;
   a free-coasting biasing member recess, in which a free-coasting biasing member is positioned; and
   a freewheeling biasing member recess-passage, in which the freewheeling biasing member is positioned.

4. The AFF according to claim 3, wherein the locking member is configured to be radially displaced and the locking member shape and configuration are configured to decrease an angle of engagement (AOE) value.

5. The AFF according to claim 4, wherein the ratio between dimension D3 and dimensions D2 (D3/D2) defining a lever effect for decreasing the angle of engagement (AOE) value.

6. The AFF according to claim 1, wherein the at least one engagement surface has teeth.

7. The AFF according to claim 1, wherein the at least one engagement surface is a race surface.

8. The AFF according to claim 1, having an axial configuration, wherein the driving member and the suspension member are fixed in the axial direction, wherein the locking member and the suspension member are coaxially mounted onto the axle and configured to be axially displaced and wherein the free-coasting and freewheeling biasing members are configured about the axle.

9. A method of operating an automatic free-coasting freewheel (AFF) having: a free-coasting state; an engaged state; and a freewheeling state, The AFF comprising:
   a driving member;
   an inertial unit having lag/inertial characteristics;
   a driven member having at least one engagement surface;
   a freewheeling biasing member; and
   an axis of rotation defining an axle, the axis having an axial and a rotation direction;
   wherein the driving member, driven member, and inertial unit are respectively coaxially mounted onto the axle and are rotatable thereupon, the driving member configured to controllably rotate relative to the inertia unit in the rotation direction, depending upon the free coasting, engaged, and freewheeling states;
   the driving and driven members respectively having respective angular velocities: $\omega_{DRIVING}$ and $\omega_{DRIVEN}$; and respective angular accelerations $\alpha_{DRIVING}$ and $\alpha_{DRIVEN}$; and
   wherein the inertial unit is positioned between the driving member and the driven member, the inertial unit further comprising a suspension member configured with at least one set of:
      i. a locking member having a locking member shape and configuration, the locking member displaceable to engage and disengage the at least one engagement surface; and
      ii. a free-coasting biasing member acting on the locking member to shift it away from the engagement surface;
   wherein the inertial unit interacts between the driving and the driven member and controllably maintains and automatically shifts between the free-coasting, engaged, and freewheeling states, depending upon $\alpha_{DRIVING}$ versus a threshold driving member angular acceleration value ($\alpha_{MIN}$) and $\omega_{DRIVEN}$ and $\omega_{DRIVING}$, according to the following steps:
   shifting from the free-coasting state to the engaged state when $\alpha_{DRIVING} \geq \alpha_{MIN}$ and when $\omega_{DRIVEN} \leq \omega_{DRIVING}$;
   shifting from the free-coasting state to the freewheeling state when $\alpha_{DRIVING} \geq \alpha_{MIN}$ and when $\omega_{DRIVEN} > \omega_{DRIVING}$;
   shifting from the engaged state to the freewheeling state when $\omega_{DRIVEN} > \omega_{DRIVING}$ and $\alpha_{DRIVING} \geq \alpha_{MIN}$;
   shifting from the freewheeling state to the engaged state when $\alpha_{DRIVEN} \leq \omega_{DRIVING}$ and $\alpha_{DRIVING} \geq \alpha_{MIN}$;
   shifting from the engaged state to the free-coasting state when $\alpha_{DRIVING} \leq \alpha_{MIN}$ and $\omega_{DRIVING} < \omega_{DRIVEN}$; and
   shifting from the freewheeling state to the free-coasting state when $\alpha_{DRIVING} < \alpha_{MIN}$ and $\omega_{DRIVING} < \omega_{DRIVEN}$;
   and
   whereby the freewheeling biasing member biases the locking member and the engagement surface away from each other in the freewheeling state.

10. The AFF according to claim 9, whereby the locking member is radially displaceable.

11. The AFF according to claim 9, whereby the locking member and suspension member are axially displaceable and where the free-coasting and freewheeling biasing members are configured about the axle.

* * * * *